(12) United States Patent
Shibata et al.

(10) Patent No.: US 8,937,731 B2
(45) Date of Patent: Jan. 20, 2015

(54) IMAGE PROCESSING APPARATUS FOR RECEIVING A REQUEST RELATING TO IMAGE PROCESSING FROM AN EXTERNAL SOURCE AND EXECUTING THE RECEIVED REQUEST

(75) Inventors: Koichi Shibata, Sakai (JP); Masakazu Murakami, Itami (JP)

(73) Assignee: Konica Minolta Business Technologies, Inc., Chiyoda-ku, Tokyo (JP)

( * ) Notice: Subject to any disclaimer, the term of this patent is extended or adjusted under 35 U.S.C. 154(b) by 2350 days.

(21) Appl. No.: 10/772,436

(22) Filed: Feb. 6, 2004

(65) Prior Publication Data

US 2005/0046887 A1 Mar. 3, 2005

(30) Foreign Application Priority Data

Sep. 1, 2003 (JP) .................................. 2003-309293
Sep. 1, 2003 (JP) .................................. 2003-309294
Sep. 1, 2003 (JP) .................................. 2003-309295

(51) Int. Cl.
*G06F 15/00* (2006.01)
(Continued)

(52) U.S. Cl.
CPC .... *H04N 1/00954* (2013.01); *H04N 2201/0046* (2013.01); *H04N 1/00204* (2013.01);
(Continued)

(58) Field of Classification Search
USPC ........................................................ 358/1.15
See application file for complete search history.

(56) References Cited

U.S. PATENT DOCUMENTS

| 7,042,593 B2 * | 5/2006 | Matsushima ................. 358/1.9 |
| 2002/0054326 A1 | 5/2002 | Morita |
| 2002/0054397 A1 | 5/2002 | Matsushima |

(Continued)

FOREIGN PATENT DOCUMENTS

| JP | 2001-249814 | 9/2001 |
| JP | 2002-84383 | 3/2002 |
| JP | 2002-204332 | 7/2002 |

OTHER PUBLICATIONS

Japanese Office Action dated Sep. 27, 2005.
Japanese Office Action dated Oct. 11, 2005.

*Primary Examiner* — Vu B Hang
*Assistant Examiner* — Mark Milia
(74) *Attorney, Agent, or Firm* — Buchanan Ingersoll & Rooney PC

(57) ABSTRACT

Disclosed is an image processing apparatus composed in a hierarchical architecture of a hardware resource, a first control program over the hardware resource, a second control program and an application program over the first control program. The first control program includes a first API for receiving a first request relating to image processing from the second control program and a second request relating to image processing from the application program, and controls, on receiving either of the first and second requests, the hardware resource to perform image processing based on the received request. The second control program includes a second API publicly released in advance for receiving a third request relating to image processing from an external source, converts the received third request to a command supported by the first API, and passes the command as the first request to the first control program.

19 Claims, 14 Drawing Sheets

(51) Int. Cl.
  H04N 1/00    (2006.01)
  *H04N 1/32*    (2006.01)
(52) U.S. Cl.
  CPC .............................. *H04N 2201/0024* (2013.01); *H04N 2201/0074* (2013.01); *H04N 1/32561* (2013.01); *H04N 2201/0094* (2013.01)
  USPC ........................................................ 358/1.15

(56) References Cited

U.S. PATENT DOCUMENTS

2004/0030693 A1* 2/2004 Toda .................................. 707/4
2004/0070782 A1* 4/2004 Mihira ......................... 358/1.14

* cited by examiner

DATA FLOW ON SCAN JOB (INSTRUCTION FROM PC TO START SCANNING)

DATA FLOW ON PRINT JOB (TRANSMISSION OF PRINT DATA FROM PC)

DATA FLOW ON SCAN JOB (TRANSMISSION OF SCAN IMAGE TO PC)

DATA FLOW ON SCAN JOB (INSTRUCTION FROM PC TO START SCANNING)

DATA FLOW ON SCAN JOB (INSTRUCTION FROM PC TO START SCANNING)

DATA FLOW ON SCAN JOB (TRANSMISSION OF SCAN IMAGE TO PC)

DATA FLOW ON PRINT JOB (TRANSMISSION OF PRINT DATA FROM PC)

IMAGE PROCESSING APPARATUS FOR RECEIVING A REQUEST RELATING TO IMAGE PROCESSING FROM AN EXTERNAL SOURCE AND EXECUTING THE RECEIVED REQUEST

This application is based on applications Nos. 2003-309293, 2003-309294, and 2003-309295 filed in Japan, the contents of which are hereby incorporated by reference.

BACKGROUND OF THE INVENTION (1) Field of the Invention

The present invention relates to an image processing apparatus for receiving a request relating to image processing from an external source and executing the received request.

(2) Description of the Related Art

Recently, so-called digital multifunction peripherals (hereinafter, "MFPs") are in wide use in an office environment as well as in other environments. MFPs are peripherals having multifunction including: a scan job of scanning an image of a document; a copy job of printing out scanned image data of a document; a print job of printing out image data according to a print instruction given from an external terminal; and a FAX job of transmitting/receiving image data to/from an external FAX device.

Being capable of performing multifunction, MFPs are advantageous for users in that there is no need to have separate devices such as copiers and printers, and that reduced cost and improved usability are realized.

Turning now to MFP developers' view, it is required to develop a number of software programs (hereinafter, referred to as "applications") for carrying out a number of functions such as scanning. Naturally, it takes enormous amounts of time to provide all the software programs individually. To address this disadvantage, JP unexamined patent application publication No. 2002-84383, for example, discloses a technique to build a platform with a general-purpose operating system (hereinafter, "OS") and portions common to all the applications. Consequently, efficient development of applications is enabled because what need to be developed are portions other than the platform.

Although efficiency in development is realized, the above technique has a following problem. That is, after delivery of an MFP to a user, the user may request additional functionality that any applications existing in the MFP are not capable of (so-called a customizing request). Unfortunately, however, the MFP is not configured to meet the request easily. For example, when the user desires scanning to be performed in a mode not provided by an existing scan application, the existing application must be altered on the whole exclusively for that particular user, which requires time-consuming work and thus is not practical. As above, MFPs according to the conventional technique are extremely poor in the scalability of functionality.

SUMMARY OF THE INVENTION

The present invention is made in view of the problems noted above, and has an object to provide an image processing apparatus which allows easy extension of the functionality with substantially no alterations to existing applications.

The object stated above is achieved by an image processing apparatus composed of: a hardware resource that includes at least one of an image forming unit, a read unit, and a display unit; a first control program; a second control program; and an application program. The hardware resource and the programs are arranged in such a hierarchical architecture that the first control program is superordinate to the hardware resource, and the application program and the second control program are superordinate to the first control program. The first control program includes a first API (application program interface) for receiving a first request relating to image processing from the second control program and a second request relating to image processing from the application program. On receiving either of the first and second requests, the first control program controls the hardware resource to perform image processing based on the received request. The second control program includes a second API publicly released in advance for receiving a third request relating to image processing from an external source, converts the received third request to a command supported by the first API, and passes the command as the first request to the first control program.

With the configuration stated above, the image processing apparatus is provided with the second control program. Consequently, even after the image processing apparatus is delivered to a user, it is possible to extend the functionality of the image processing apparatus without altering the existing application program, so that additional functionality that the existing application is incapable of can be performed from an external source through the second application program. In short, the image processing apparatus is of improved scalability and improved user convenience.

Alternatively, the object stated above is achieved by an image processing apparatus composed of: a hardware resource including at least one of an image forming unit, a read unit, and a display unit; a first control program; a second control program; and an application program. The hardware resource and the programs are arranged in a hierarchical architecture in the stated order. The first control program includes a first API for receiving a first request relating to image processing from the second control program, and controls the hardware resource to perform image processing based on the received first request. The second control program includes a second API that is publicly released in advance for receiving a second request relating to image processing from an external source and a third request relating to image processing from the application program. On receiving either of the second and third requests, the second control program converts the received request to a command supported by the first API, and passes the command as the first request to the first control program. Further, the object stated above is also achieved by an image processing apparatus composed of: a hardware resource including at least one of an image forming unit, a read unit, and a display unit; a first control program; a second control program; and an application program. The first control program is arranged between the hardware resource and the application program and the second control program is arranged superordinate to the application program in a hierarchical architecture. The first control program includes a first API for receiving a first request relating to image processing from the second control program and a second request relating to image processing from the application program. On receiving either of the first and second requests, the first control program controls the hardware resource to perform image processing based on the received request. The second control program includes a second API that is publicly released in advance for receiving a third request relating to image processing from an external source, converts the received third request to a command supported by the first API, and passes the command to an appropriate one of the first control program and the application program depending on the requested processing. The command passed to the first control program serves as the first request. On receiving the command from the second control program, the application program passes to the first control program, a request for performing the processing based on the received command. The request passed to the first control program serves as the second request.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings.

DESCRIPTION OF THE PREFERRED EMBODIMENT

Hereinafter, with reference to accompanying drawings, description is given to MFPs, which are preferred embodiments of an image processing apparatus according to the present invention.

First Embodiment

Figure 1:
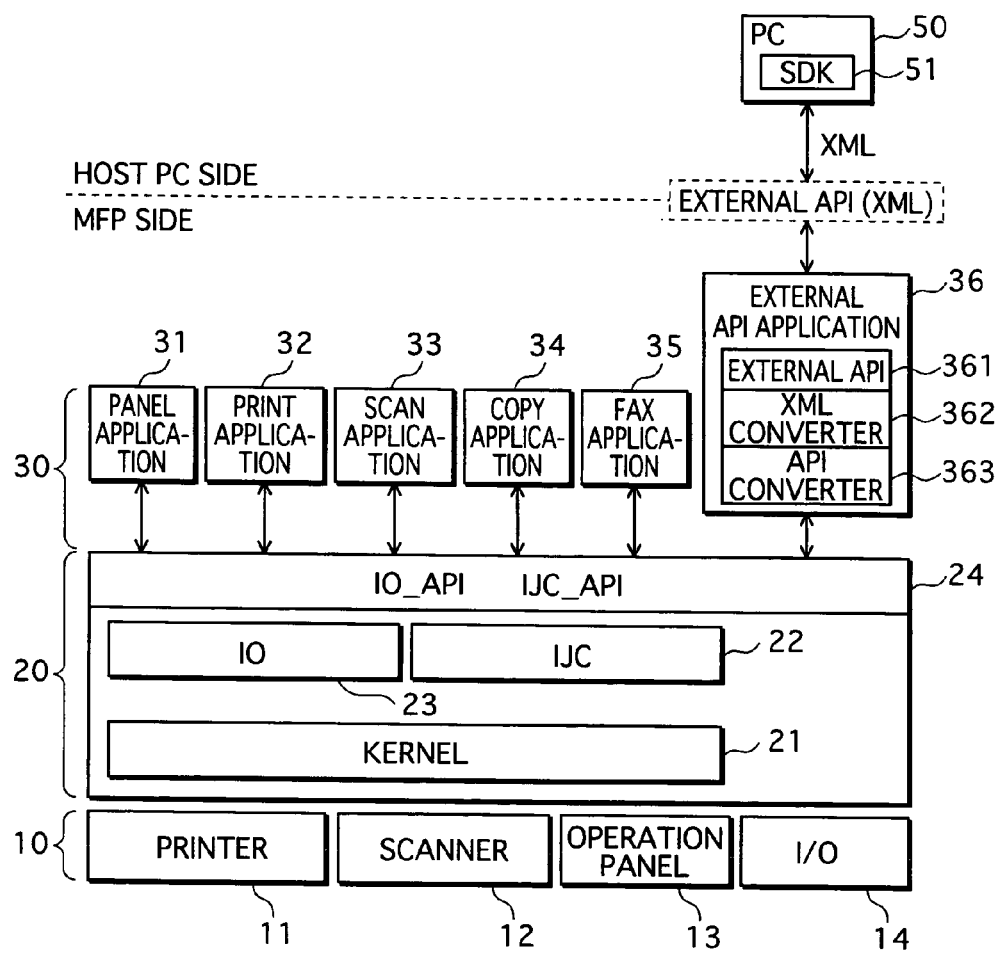
FIG. 1 is a view illustrating a system configuration of an MFP according to a first embodiment of the present invention.

FIG. 1 is a view illustrating a system configuration of an MFP 1 according to a first embodiment of the present invention.

As illustrated in the figure, an MFP 1 has a hierarchical architecture with a device layer (hardware resource) 10 as the bottommost layer, a control layer 20 directly controlling the device layer 10, and an application layer 30 as the topmost layer. The MFP 1 is a digital multifunction peripheral capable of a plurality of jobs relating to image processing, including the above-described scan job, copy job, print job, and FAX job. Further, the MFP 1 is connected to a personal computer (hereinafter, "PC") 50 via a network (not illustrated) such as a LAN, and mutually receive and transmit various data using, for example, TCP/IP (Transmission Control Protocol/Internet Protocol).

The device layer 10 includes a printer 11 acting as an image forming unit, a scanner 12 acting as a read unit, an operation panel 13 acting as a display unit, and an I/O unit 14.

The printer 11 is a conventional electrophotographic printer that prints out image data on a sheet of paper. The scanner 12 is also a conventional device that scans an image of a document with a photoelectric converter such as a CCD (Charge Coupled Device), thereby acquiring image data. The operation panel 13 includes input-keys and a monitor that acts as a display unit, receives a keyed input from a user, and displays various messages on the monitor. The I/O unit 14 includes a CPU, a RAM, a ROM, a hard disk, and an interface device (such as an NIC: Network Interface Card) with an external device.

The control layer 20 (first control program) includes a kernel 21, a module (IJC: Image Job Controller) 22 for controlling operations of each device, an interface module (IO: Input-Output) 23 for controlling communications with an external device, and IO API and IJC API (hereinafter, referred to collectively as "IO/IJC API") 24. The control layer 20 acts as an OS.

The IO/IJC API 24 is an API (Application Program Interface) for providing functionality of the IJC 22 and the IO 23 (i.e., functionality of the control layer 20) to applications 31-36 residing on the application layer 30. To be more specific, the IO/IJC API 24 is a collection of functions callable by each application in order to access functionality of the IJC 22 and IO 23. In other words, the IO/IJC API 24 receives requests relating to image processing from each application through the use of predefined functions.

The application layer 30 includes the above-mentioned applications 31-36, each of which makes an access to the IO/IJC API 24 in order to actually drive the devices. In other words, each application calls an appropriate one of the predefined functions as necessary to actually drive a desired device.

For example, the application 31 is a panel application for controlling display of the operation panel 13. To be more specific, on receiving information indicting keyed input from the operation panel 13 via the control layer 20, the panel application 31 operates so as to display a message on the monitor of the operation panel 13 according to the received information. For example, on receiving information indicating a push of a copy-start key, the panel application 31 operates so as to display a "now copying" message on the monitor.

When activated for performing a print job, the print application 32 converts print data received from an external device in PDL (Page Description Language) into bitmapped image data, and controls the printer 11 to perform a print job based on the bitmapped image data.

When activated for performing a scan job, the scan application 33 controls the scanner 12 to read (i.e., to scan) an image of a document, thereby acquiring image data.

When activated for performing a copy job, the copy application 34 controls the scanner 12 to scan an image of a document, and then controls the printer 11 to perform a print job based on the scanned image data.

When activated for performing a FAX transmission job, the FAX application 35 controls e.g. the scanner 12 to scan an image of a document to acquire image data, and then converts the image data to data for facsimile transmission, and transmits the resulting data to a designated transmission destination. When activated for performing a FAX reception job, the FAX application 35 controls the printer 11 to perform a print job based on image data received from e.g. a transmitting end.

The external API application 36 (second control program) is a program for controlling operations of each device according to a request relating to image processing received from an external device. The external API application 36 includes an external API 361, an XML (Extensible Markup Language) converter 362, and an API converter 363.

The external API 361 is an API for providing functionality of the control layer 20 to an external device (the PC 50, for example), and is a collection of functions callable by the PC 50 in order to access functionality of the control layer 20. In other words, the external API 361 receives requests relating to image processing from an external device through the use of predefined functions.

Note that the external API 361 is released publicly to external users (for example, software developers) in advance. With reference to the released external API, the external users are able to develop software for accessing functionality of the control layer 20.

To be more specific, since the external API 361 is released to public, external users are allowed to know what commands and parameters are provided for controlling the devices of the MFP 1 and what the syntax is for writing the commands. Examples of the commands include a command specifying a job to be performed and a command specifying a job start. Further, examples of the parameters include a parameter specifying job conditions such as a scan size and a resolution for a scan job, and the number of copies for a copy job.

External users develop software for transmitting data containing a command and a parameter written in the syntax (in this example, XML formatted data, see FIG. 2) to the MFP 1. By running the software transmits XML data containing a request and a parameter relating to image processing to the MFP 1, the external uses can cause a desired device to perform a desired operation.

The external API 361 is a collection of a plurality of sets of functions that are predefined as the IO/IJC API 24. For example, when a series of operations performed by a specific device is defined in the IO/IJC API 24 as functions A, B, and C, the three functions are defined collectively as a function D in the external API 361 (i.e., calling the function D causes the functions A, B, and C to be called).

Since a series of operations is defined by a single function, the external users are allowed to cause the series of operations by calling the function D from the PC 50. Calling the function D is equal in effect to calling the functions A, B, and C. That is, the external API 361 eliminates the need for using numerous functions, and thus provides the external users with easiness and convenience in developing such software as described above. Note that a function that defines one complete operation is used as it is.

The XML converter 362 extracts predetermined information from XML data received from the PC 50 as will be described later in detail. The predetermined information includes a command and other data that indicate the substance of a processing request.

The API converter 363 converts the extracted command and other data (a request relating to image processing transmitted from the PC 50) into a predetermined data format executable by the control layer 20, and passes the resulting data to the control layer 20. In this example, communications of XML data between the PC 50 and the external API application 36 are performed using a conventional SOAP (Simple Object Access Protocol).

Referring now to the PC 50, the PC 50 includes a main body, a monitor, a keyboard, a network interface, which are not illustrated, and also an SDK (Software Development Kit) 51. The SDK 51 is used by external users to assist development of such software as described above.

In FIG. 1, on a boundary between a host PC side and an MFP side represented by a broken line, an "external API (XML)" is illustrated in a dotted box to indicate that the API (the external API) used by the PC 50 is formatted as XML data.

With provision of the external API application 36 described above, it is possible to cause the MFP 1 from an external source to perform functionality that the applications provided within the MFP 1 are incapable of.

To be more specific, for example, the scanner 12 is capable of scanning an image of a document at any resolutions of 1,200, 600, and 400 dpi (dot per inch). Yet, the scan application 33 is incapable of receiving a user selection of scanning resolution (for example, the resolution is fixed to the lowest one of 400 dpi). Here, by publicly releasing the external API 361 that includes information necessary for performing a scan job at a desired resolution, external users are allowed to develop software that transmits to the MFP 1, XML data containing a command and other data necessary for the scan job. In other words, the desired scan job can be performed from an external source.

Hereinafter, with reference to FIGS. 2 and 3, description is given in detail to specific examples in which the above scan job is performed.

Figure 2:
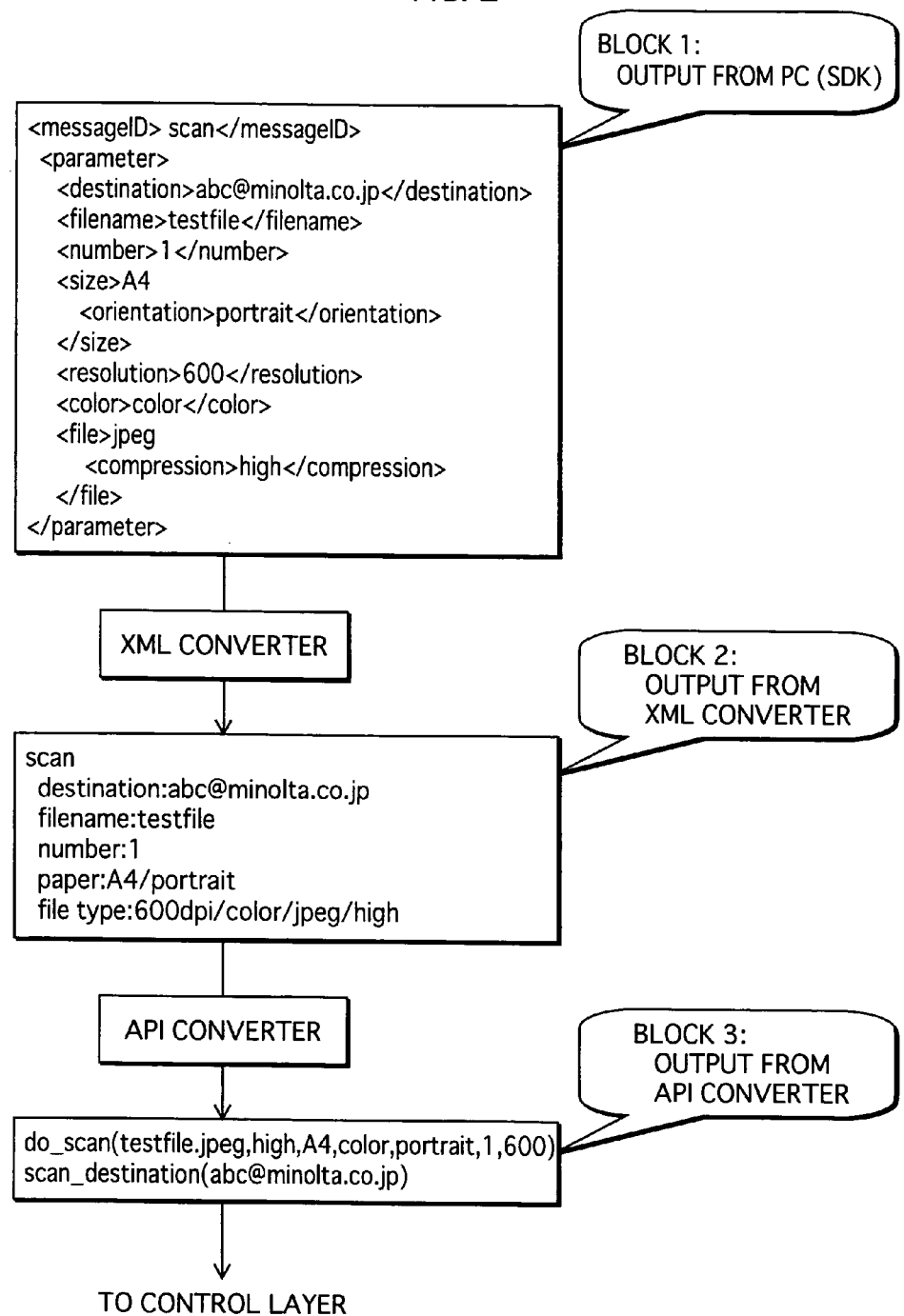
FIG. 2 is a schematic view illustrating XML data that contains a command and other data necessary for instructing a scan job at a desired scanning resolution, and how the XML data is converted as it is passed from a PC to a control layer via an external API application of the MFP.

FIG. 2 is a schematic view illustrating XML data generated by an external user based on the released API. The XML data contains a command and other data necessary for instructing the desired scan job. FIG. 2 also shows how the XML data is converted as it is passed from the PC 50 to the control layer 20 via the external API application 36 of the MFP 1.

The job requested in this example is to scan an image of a document and subsequently transmit the scanned image to the PC 50 under the following conditions: Number of Pages: 1, Document Size: A4, Orientation of Document: portrait (i.e. vertical) orientation, color document, Scanning Resolution: 600 (dpi), Jpeg High-Compression, File Name: testfile, and Transmission Destination (PC 50): abc@minolta.co.jp. Note that the example illustrated in the figure is simplified for the convenience sake of description. Practically, a greater number of different commands are necessary to carry out one job, and various other information items including a header are appended to communication data.

As illustrated in the figure as a block 1, the PC 50 outputs XML data describing information items, such as a document size, enclosed in predetermined tags. In the block 1, "scan" enclosed in "message ID" tags is a command, and "destination" and other information items enclosed in "parameter" tags are parameters for the command.

Received by the MFP 1, the XML data is passed via the IO 23 to the XML converter 362 of the external API application 36 where the XML data is converted to data shown as a block 2 in the figure.

To be more specific, the XML converter 362 extracts a command and corresponding parameters from the received XML data. That is to say, the data shown as the block 2 is a data string outputted from the XML converter 362 in the case where the PC 50 calls the function "scan" that has been publicly released as the external API 361.

The data shown as the block 2 is then sent to the API converter 363 where it is converted to a format directly executable by the control layer 20 (i.e., to a command supported by the IO/IJC API 24). The resulting data is shown in the figure as a block 3.

In the block 3, "do_scan" and "scan_destination" are functions instructing the control layer 20 to actually perform the scan job, and subsequent parameters in parentheses are arguments of the functions.

The control layer 20 performs the functions as they are called. To be more specific, the control layer 20 controls the scanner 12 to scan an image of a document according to the specified scanning conditions (such as Document Size: A4 and Scanning Resolution: 600 dpi), and transmits the scanned image data to the PC 50 being the designated transmission destination (abc@minolta.co.jp).

Figure 3:
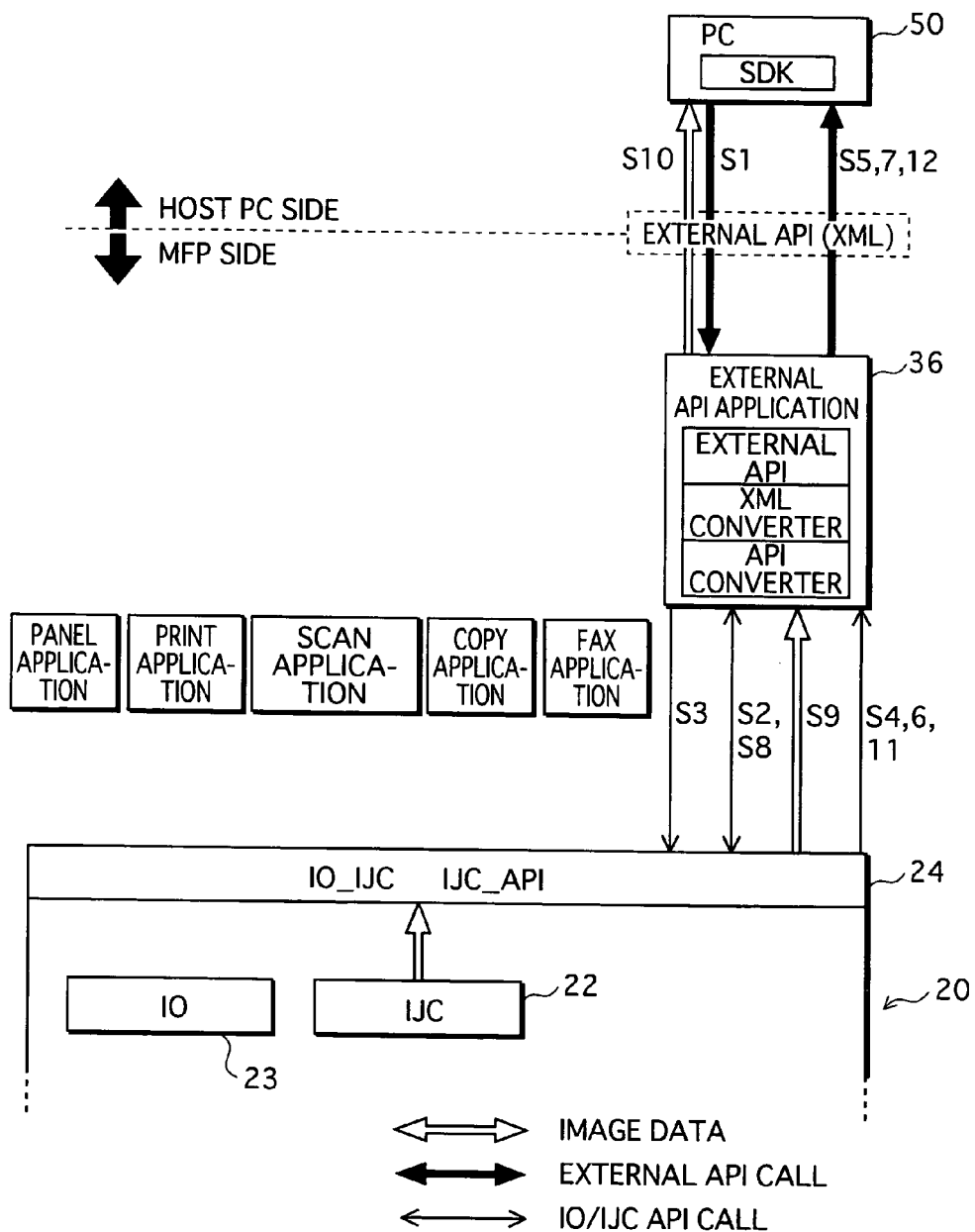
FIG. 3 is a schematic view illustrating the data flow between the PC and the MFP for performing the above scan job.

FIG. 3 is a schematic view illustrating the data flow between the PC 50 and the MFP 1 for performing the scan job described above. In the figure, a slender arrow indicates an operation performed in response to a call to the IO/IJC API 24, a thick arrow indicates an operation performed in response to a call to the external API 361, and a white arrow indicates image data. The same description applies to FIGS. 4, 5, 7, and 8.

On receiving an external API call from the PC 50 to start the scan job (S1), the external API application 36 operates to receive XML data (data shown in FIG. 2 as the block 1 that contains specifications of the scanning resolution and the like) from the PC 50 (S2).

The external API application 36 instructs the control layer 20 to perform the scan job (S3), and receives a response to the instruction, such as an OK signal to start the scan job (S4). On receiving the response, the external API application 36 informs the PC 50 about the received response (S5). On receiving a ready signal for the requested job from the control layer 20 (S6), the external API application 36 informs the PC 50 that the MFP 1 is in a state of readiness to start the requested job (S7) and subsequently informs the control layer 20 about the specified scanning conditions including the scanning resolution and the document size, and also about the transmission destination (S8).

In response, the control layer 20 controls the scanner 12 to scan an image of a document according to the specified scanning conditions including the scanning resolution, and sends the scanned image data to the external API application 36 via the IJC 22 (S9).

On receiving the image data from the control layer 20 (the IJC 22), the external API application 36 so operates that the image data is transmitted to the PC 50 being the transmission destination via the IO 23 (S10).

Thereafter, the external API application 36 receives an end-of-job signal (S11). On receiving such a signal, the external API application 36 informs the PC 50 about the end of job (S12), and terminates the processing.

As described above, by transmitting an appropriate command and parameter from the PC 50 to the MFP 1 accordingly to the released API, a scan job that the scan application 33 is incapable of can be performed from an external source without activating the scan application 33.

Although in the above example, the scan job is performed without activating the scan application 33, a scan job can also be performed from an external source through the scan application 33 on condition that the external API 361 publicly released includes information necessary to perform such a scan job. Now, description is given with reference to FIG. 4 to an example of performing a scan job from an external source through the scan application 33.

Figure 4:
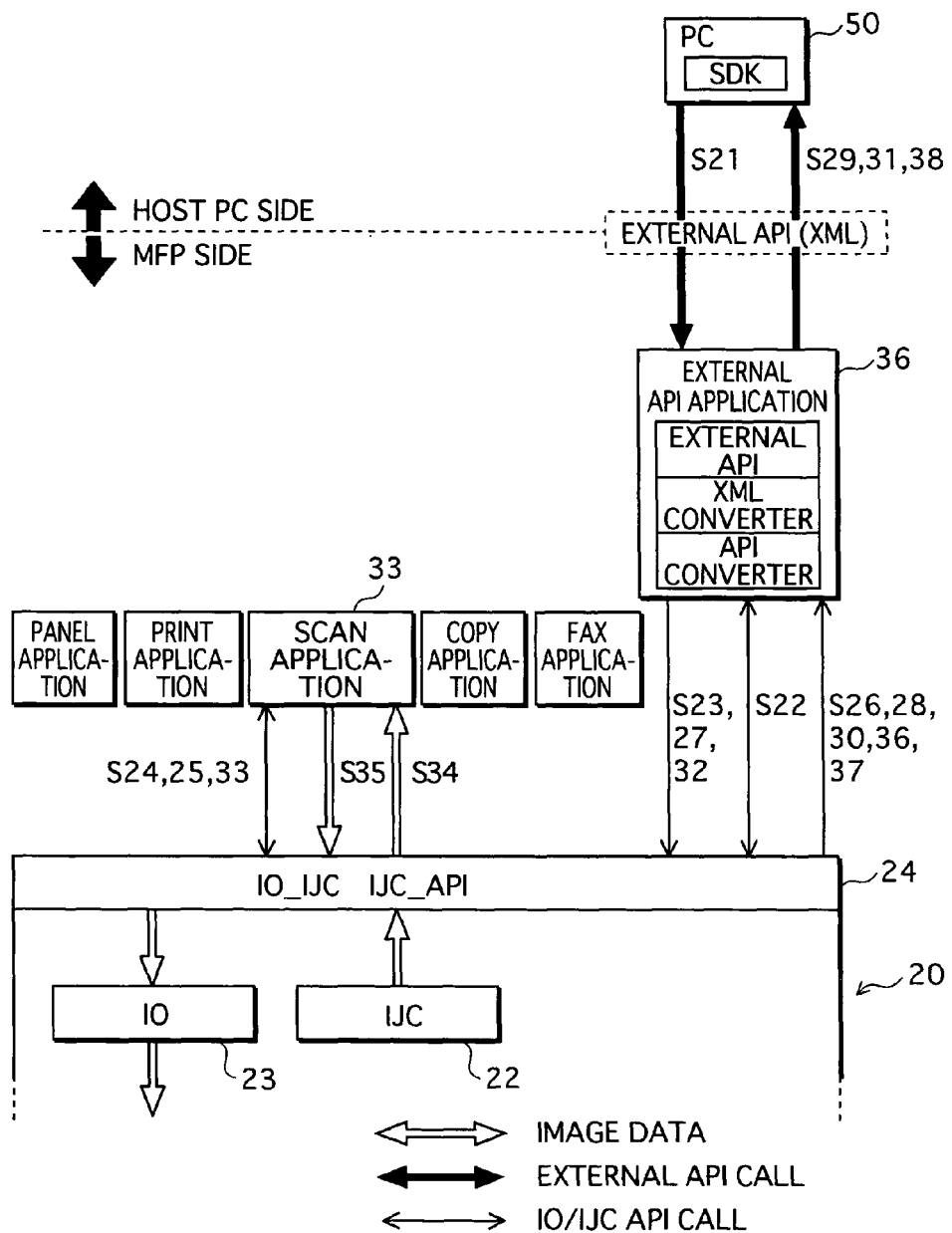
FIG. 4 is a schematic view illustrating the data flow for performing a scan job through a scan application.

FIG. 4 is a schematic view illustrating the data flow for performing a scan job through the scan application 33.

First, the external API application 36 receives an external API call to start a scan job (a predetermined command for activating the scan application 33 to perform a scan job) from the PC 50 via the IO 23 (S21). On receiving the call, the external API application 36 operates to receive XML data (designating scanning conditions such as a page size and also a transmission destination) from the PC 50 (S22), and requests the scan application 33 to confirm that the scan application 33 is connected with the IO 23 (S23). When the scan application 33 and the IO 23 confirm the connection therebetween (S24), a connection confirmation notification is issued (S25), and then the external API application 36 receives the notification from the control layer 20 (S26).

The external API application 36 instructs the control layer 20 to start the scan job (S27), and receives a response to the instruction such as an OK signal to start the scan job (S28). On receiving the response, the external API application 36 informs the PC 50 about the received response (S29). On receiving a ready signal for the requested job (S30), the external API application 36 informs the PC 50 that the MFP 1 is in a state of readiness to start the requested job (S31), and subsequently informs the scan application 33 about the scanning conditions including the document size and also about the transmission destination (a processing request is passed from the control layer 20 to the scan application 33) (S32).

In response, the scan application 33 controls the scanner 12 to scan an image of a document according to the specified scanning conditions, and makes a request to acquire the scanned image data (S33). On receiving the image data from the control layer 20 (the IJC 22) (S34), the scan application 33 then conducts predetermined processing such as data compression on the received image data, and transmits the resulting image data to the designated transmission destination via the IO 23 (S35).

The external API application 36 sequentially receives information indicating states of the job being carried out (S36). For example, the external API application 36 receives information indicating that conversion to a transmission file being processed and information indicating that transmission being processed. On receiving an end-of-job signal (S37), the external API application 36 informs the PC 50 about the end of job (S38), and terminates the processing.

As described above, a scan job can be performed through the scan application 33 by transmitting an appropriate command from an external source to the MFP 1 for activating the scan application 33. On receiving such a command, the scan application 33 can carry out necessary control of the scanner 12. Consequently, external users are allowed to perform a series of operations from scanning of a document image to transmission of the scanned image data to a designated transmission destination without specifying every operation using a predetermined command. That is to say, external users are allowed to perform a scan job with ease.

Figure 5:
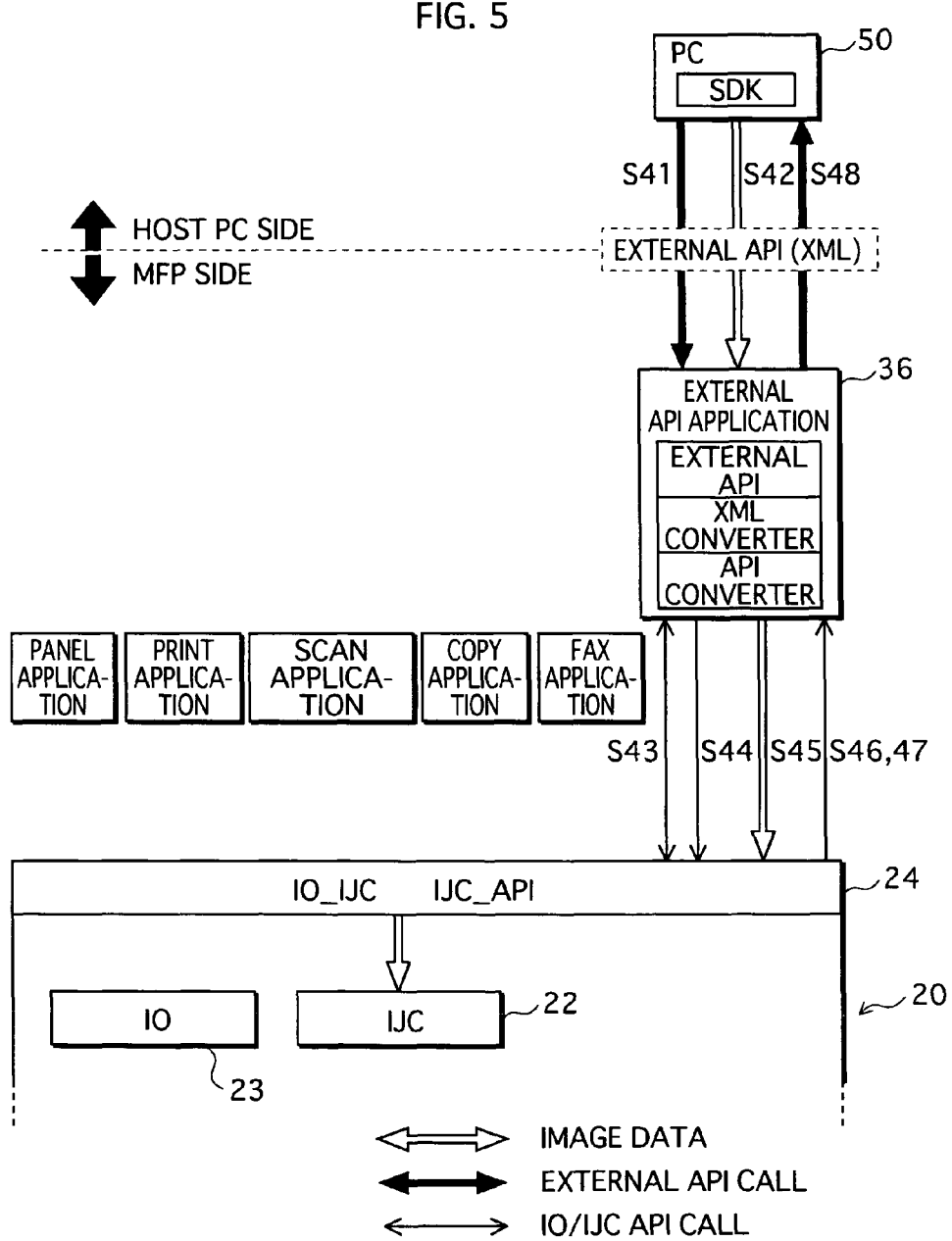
FIG. 5 is a schematic view illustrating the data flow for performing a print job of printing out image data transmitted from the PC.

Next, description is given with reference to FIG. 5 to an example in which a print job is performed from an external source without activating the print application 32. Similarly to the above examples, the external API 361 publicly released includes information necessary for performing a print job without activating the print application 32.

As illustrated in FIG. 5, the external API application 36 receives an external API call to start a print job (a predetermined command for performing a print job without activating the print application 32) from the PC 50 (S41), and subsequently receives image data from the PC 50 (S42) as well as XML data (specifying print conditions such as paper size, a number of sheets to be printed) (S43).

The external API application 36 then informs the IJC 22 residing on the control layer 20 about a print instruction and conditions necessary for the print job, such as a paper size (S44), and subsequently sends the image data (S45).

The control layer 20 controls the printer 11 to start the print job based on the received print conditions and image data. Further, the control layer 20 sequentially sends information indicating a job status to the external API application 36, such as a print job being processed or an end of job (S46).

The external API application 36 receives from the control layer 20, information indicating that the print job is being processed and then receives information indicating an end of job (S47). On receiving the latter information, the external API application 36 informs the PC 50 about an end of job (S48) and terminates the processing.

As described above, by transmitting an appropriate command and other data from the PC 50 to the MFP 1 for controlling the printer 11 to perform a print job, the print job can be performed without activating the print application 32. Consequently, for example, bitmapped image data that the print application 32 is incapable of handling can be printed out by transmitting such data from the PC 50 to the MFP 1 directly. In other words, it is avoided that data that the PC 50 can manage is refused due to incapability of the print application 32. As a result, the scalability of the MFP 1 improves.

Similarly to the data string for a scan job illustrated in FIG. 2, in the case of other print jobs or copy jobs, XML data composed of commands and parameters required for a requested job is transmitted from the PC 50 to the MFP 1 as data containing a request relating to image processing. The XML data is passed to the control layer 20 after converted by the external API application 36 to a command supported by the control layer 20.

As described above, the MFP 1 according to the first embodiment includes the external API application 36 that receives from an external source, XML data containing a request relating to image processing, converts the XML data to commands supported by the API of the control layer 20, and passes the resulting commands to the control layer 20. Accordingly, even after the MFP 1 is delivered to the user, it is possible to extend the functionality of the MFP 1 without any alterations to the existing applications provided therein, so that new functionality that the existing applications are incapable of can be performed. For example, it is possible to perform a scan job at a specified resolution as described above and a print job of data in a format that the print application 32 is incapable of handling. In other words, the MFP 1 provides users with the improved scalability and improved convenience.

Further, the MFP 1 is constructed by adding (disposing) the external API application 36 to a configuration composed of the hardware resource 10, the control layer 20, and the application layer 30 arranged in hierarchy in the stated order. The external API application 36 is to be disposed on the same layer as the applications 31-35. That is to say, the currently available applications are usable to constitute the MFP 1 basically as they are (without alterations). Accordingly, there are advantages for MFP developers in saving time and work for alteration and checking of the applications, and thus the development is completed in a shorter time period with smaller work load than that would otherwise be required.

Further, the MFP 1 accepts commands and other information described in XML, which is an easy language for external software developers to handle. Further, since the MFP 1 is configured to receive XML data, the MFP developers are allowed to define their own logical structure for data to be received as a processing request from an external source, which increases flexibility in the MFP development.

Still further, the communication protocols that may be employed therein include a conventional SOAP, which is used by external users easily and conveniently.

Still further, when a processing request is directed to an application provided in the MFP 1, the processing request is passed to that application. Consequently, it is possible, for example, to activate the application from an external source, and thus so called a remote function is realized.

Second Embodiment

According to the first embodiment described above, the second control program (external API application) is arranged on the same layer as the applications 31-35. Second embodiment differs from the first embodiment in that a control layer, an external API unit, and an application layer are arranged in a hierarchal architecture in the stated order. For the convenience sake, the same reference numerals are used for similar or identical components and thus are not described. The same also holds in a third embodiment, which will be later described.

Figure 6:
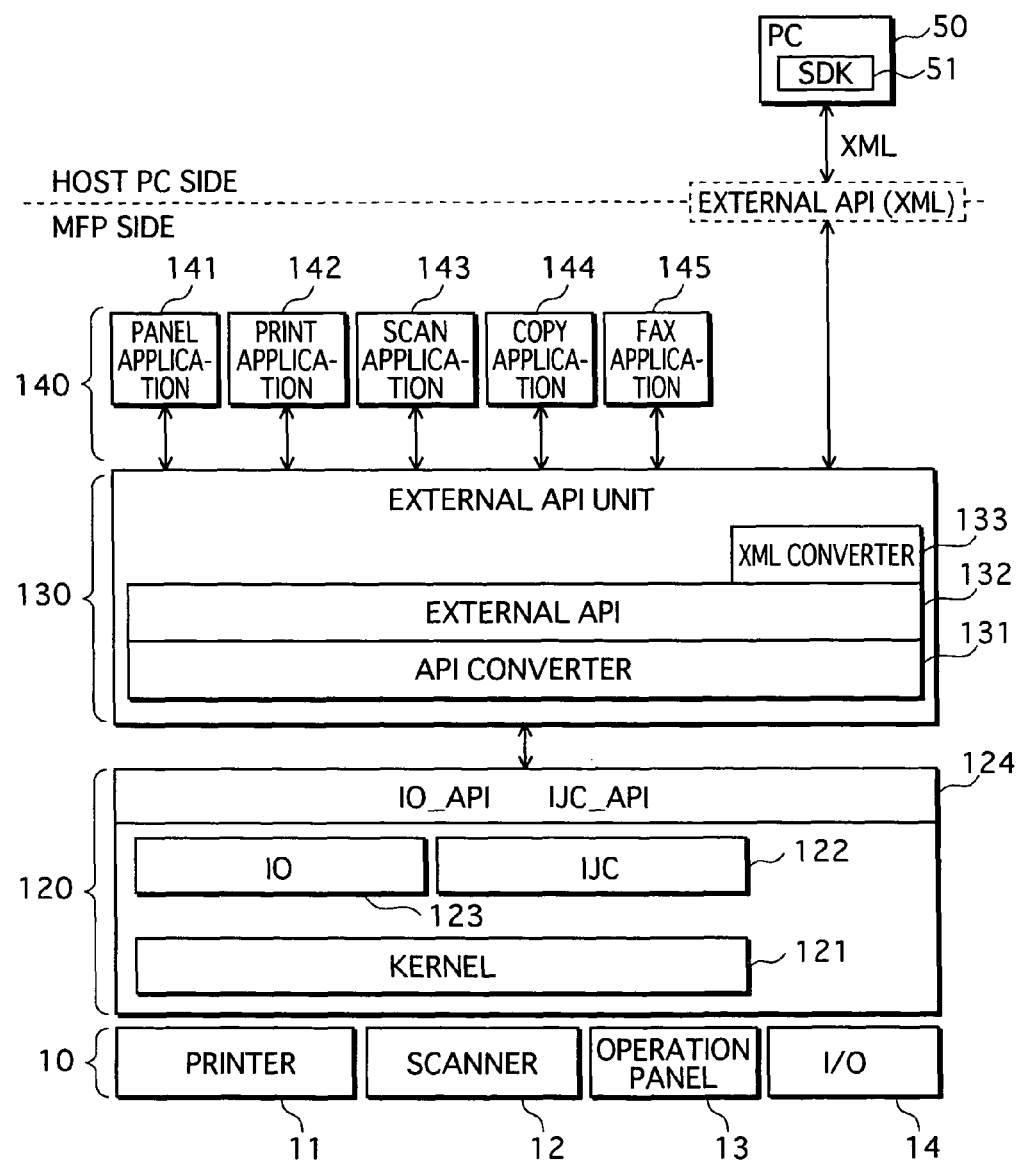
FIG. 6 is a view illustrating a system configuration of an MFP according to a second embodiment.

FIG. 6 is a view illustrating a system configuration of an MFP 100 according to the second embodiment.

As illustrated in the figure, the MFP 100 has a hierarchical architecture with a device layer (hardware resource) 10 as the bottommost layer, a control layer (first control program) 120 for directly controlling the device layer 10, an external API unit (second control program) 130 over the control layer 120, and an application layer 140 over the external API unit 130. The MFP 100 is a digital multifunction peripheral capable of a plurality of jobs relating to image processing including the above-described scan job, copy job, print job, and FAX job.

The control layer 120 includes a kernel 121, an IJC 122, IO 123, and an IO/IJC API 124. The kernel 121, the IJC 122, and the IO 123 are similar in functionality to the kernel 21, the IJC 22, and the IO 23 of the first embodiment, respectively.

The IO/IJC API 124 is an API for providing functionality of the IJC 122 and the IO 123 (i.e., functionality of the control layer 120) to applications 141-145 residing on the application layer 140 as well as to the PC 50 (hereinafter, the applications and the PC are referred to collectively as the "applications and the like") via the external API unit 130. Practically, the IO/IJC API 124 is a collection of predefined functions callable by the external API unit 130 to access functionality of the control layer 120 when the external API unit 130 receives a request relating to image processing from the applications and the like.

The external API unit 130 includes an API converter 131, an external API 132, and an XML converter 133. Further, the external API unit 130 is a program for converting a request relating to image processing received from the applications and the like into a predetermined format that is executable by the control layer 120, and passing the resulting data to the control layer 120. In other words, the external API unit 130 is an intermediate program that mediates between the control layer 120 and the applications and the like.

The external API 132 is an API for providing functionality of the control layer 120 to the applications and the like. To be more specific, the external API 132 is a collection of predefined functions callable by the applications and the like in order to access functionality of the control layer 120.

Note that the external API 132 is released publicly to external users in advance, so that the external users are allowed to develop software for accessing functionality of the control layer 120 based on the released external API 132. This is basically similar to the first embodiment.

Similarly to the external API 361 employed in the first embodiment, the external API 132 is a collection of a plurality of sets of functions that are predefined as the IO/IJC API 124. By defining a series of operations with a single function, it is not necessary for the external users to use numerous functions. Consequently, the external API 132 provides the external users with easiness and convenience in developing such software as described above.

The external API 132 brings the same advantage relatively to the applications residing on the MFP 100, and thus facilitates development of the MFP 100. Note that a function that defines one complete operation is used as it is.

The XML converter 133 extracts a command and other data from XML data transmitted from the PC 50 as will be described later in detail.

The API converter 131 receives a command and other data extracted by the XML converter 133 (i.e., a request relating to image processing transmitted from the PC 50) as well as a request relating to image processing sent from each application. Subsequently, the API converter 131 converts the received request to a predetermined format executable by the control layer 120, and passes the resulting data to the control layer 120.

The application layer 140 includes the above-mentioned applications 141-145, each of which makes an access to the external API unit 130 to call an appropriate one of the functions predefined as the external API 132 (i.e., to issue a request relating to image processing), thereby actually driving a desired device. Note that each of the panel application 141, the print application 142, the scan application 143, the copy application 144, and the FAX application 145 is identical in functionality to a corresponding application described in the first embodiment.

With provision of the external API unit 130, it is possible to instruct the MFP 100 from an external source to perform functionality that the applications provided therein are incapable of performing.

That is, similarly to the first embodiment, the scanner 12, for example, is capable of scanning an image at any of a plurality of resolutions, while the scan application 143 is incapable of receiving a selection of resolution. Here, by publicly releasing the external API 132 that includes information necessary for performing a scan job at a desired resolution, external users are allowed to develop software for transmitting XML data containing a command and parameters necessary for performing the scan job. In other words, the desired scan job can be performed from an external source.

Note that XML data containing a command and other data necessary for the desired scan job is the same as the example illustrated in FIG. 2, as well as how the XXL data is converted as it is passed from the PC 50 to the control layer 120 via the external API unit 130 of the MFP 100.

That is, the XML data (block 1) transmitted from the PC 50 is passed, within the MFP 100, to the XML converter 133 provided in the external API unit 130 via the IO 123 where it is converted to data shown as the block 2. To be more specific, the XML converter 133 extracts a command and corresponding parameters from the received XML data. In other words, the data shown as the block 2 is a data string outputted from the XML converter 133 in the case where the PC 50 calls the function "scan" that has been publicly released as the external API 132.

The data shown as the block 2 is then sent to the API converter 131 where it is converted to a format directly executable by the control layer 120 (The resulting data is shown in the figure as the block 3). The control layer 120 performs a called function.

Figure 7:
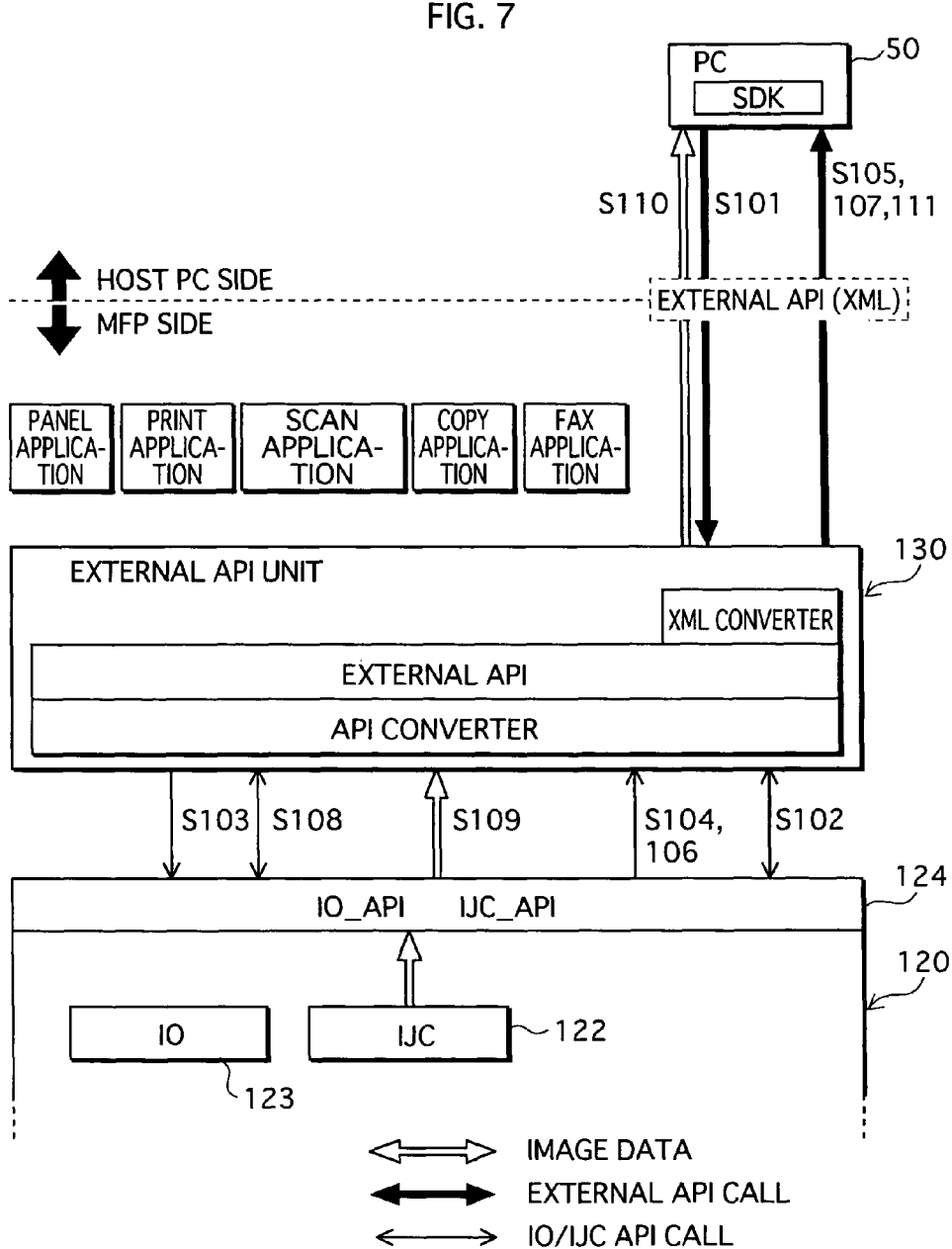
FIG. 7 is a schematic view illustrating the data flow between the PC and the MFP for performing, according to the second embodiment, a scan job at a desired scanning resolution.

FIG. 7 is a schematic view illustrating the data flow between the PC 50 and the MFP 1 for performing the scan job described above.

On receiving an external API call from the PC 50 to start a scan job (S101), the external API unit 130 operates to receive XML data containing specifications of scanning resolution and the like (i.e. the block 1 in FIG. 2) from the PC 50 (S102).

The external API unit 130 instructs the control layer 120 to perform a scan job (S103), and receives a response to the instruction such as an OK signal to start the scan job (S104). On receiving such a response, the external API unit 130 informs the PC 50 about the received response (S105). On receiving a ready signal for the requested job from the control layer 120 (S106), the external API unit 130 informs the PC 50 that the MFP 100 is in a state of readiness to start the requested job (S107), and subsequently informs the control layer 120 about the specified conditions, such as a scanning resolution (S108).

In response, the control layer 120 controls the scanner 12 to scan an image of a document according to the specified conditions, and sends the scanned image data to the external API unit 130 via the IJC 122 (S109).

On receiving the image data from the control layer 120 (the IJC 122), the external API unit 130 controls the IO 123 to transmit the image data to the PC 50 being the transmission destination (S110).

On completion of the transmission, the external API 130 informs the PC 50 that the transmission is completed (S111), and terminates the processing.

As described above, by transmitting an appropriate command and parameter from the PC 50 to the MFP 100 accordingly to the released API, a scan job that the scan application 143 is incapable of can be performed from an external source without activating the scan application 143.

Figure 8:
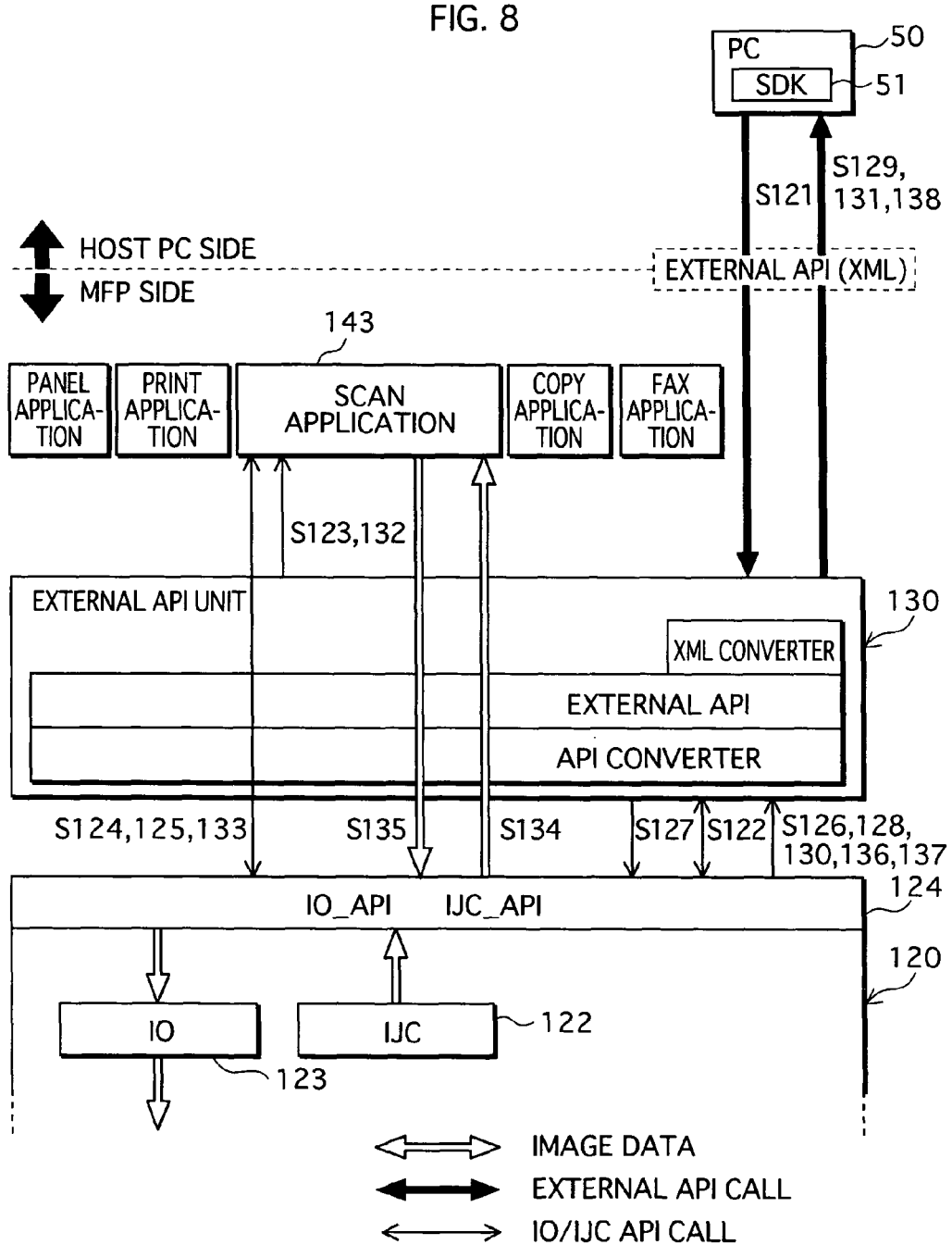
FIG. 8 is a schematic view illustrating the data flow for performing, according to the second embodiment, a scan job through a scan application.

Now, description is given with reference to FIG. 8 to an example in which a scan job is performed through the scan application 143.

As illustrated in the figure, the external API unit 130 receives an external API call to start a scan job (a predetermined command for activating the scan application 143 to perform a scan job) from the PC 50 via the IO 123 (S121). On receiving such a call, the external API unit 130 operates to receive XML data (data specifying a transmission destination as well as scanning conditions such as a paper size) from the PC 50 (S122), and requests the scan application 143 to confirm connection with the IO 123 (S123). When the scan application 143 and the IO 123 confirm the connection therebetween (S124), a connection confirmation notification is issued (S125), and then the external API unit 130 receives the notification from the control layer 120 (S126).

The external API unit 130 then instructs the control layer 120 to perform the scan job (S127), and receives a response to the instruction such as an OK signal to start the scan job (S128). On receiving such a response, the external API unit 130 informs the PC 50 about the received response (S129). On receiving a ready signal for the requested job (S130), the external API unit 130 informs the PC 50 that the MFP 100 is in a state of readiness to start the requested job (S131), and subsequently informs the scan application 143 about the scanning conditions, such as a document size, and also about the transmission destination (S132). In this case, the data converted by the XML converter 133 is passed as a processing request to the scan application 143.

In response, the scan application 143 controls the scanner 12 to scan an image of a document according to the specified scanning conditions, and makes a request to acquire the scanned image data (S133). On receiving the image data from the control layer 120 (the IJC 122) (S134), the scan application 143 then conducts predetermined processing such as data compression on the received image data, and transmits the resulting image data to the designated transmission destination via the IO 123 (S135).

The external API unit 130 sequentially receives information indicating states of the job being carried out, such as conversion to a transmission file being processed or transmission being processed (S136). On receiving an end-of-job signal (S137), the external API unit 130 informs the PC 50 about the end of job (S138), and terminates the processing.

As described above, by publicly releasing the external API 132 that includes information necessary for performing a scan job through the scan application 143, a command for activating the scan application 143 can be transmitted from an external source to the MFP 100. On receiving such a command, the scan application 143 can carry out necessary control of the scanner 12, so that the scan job is performed. Consequently, external users are allowed to perform a series of operations from scanning of a document image to transmission of the scanned image data to a designated transmission destination without specifying every operation using a predetermined command. That is to say, the external API facilitates external users to remotely perform a scan job.

Figure 9:
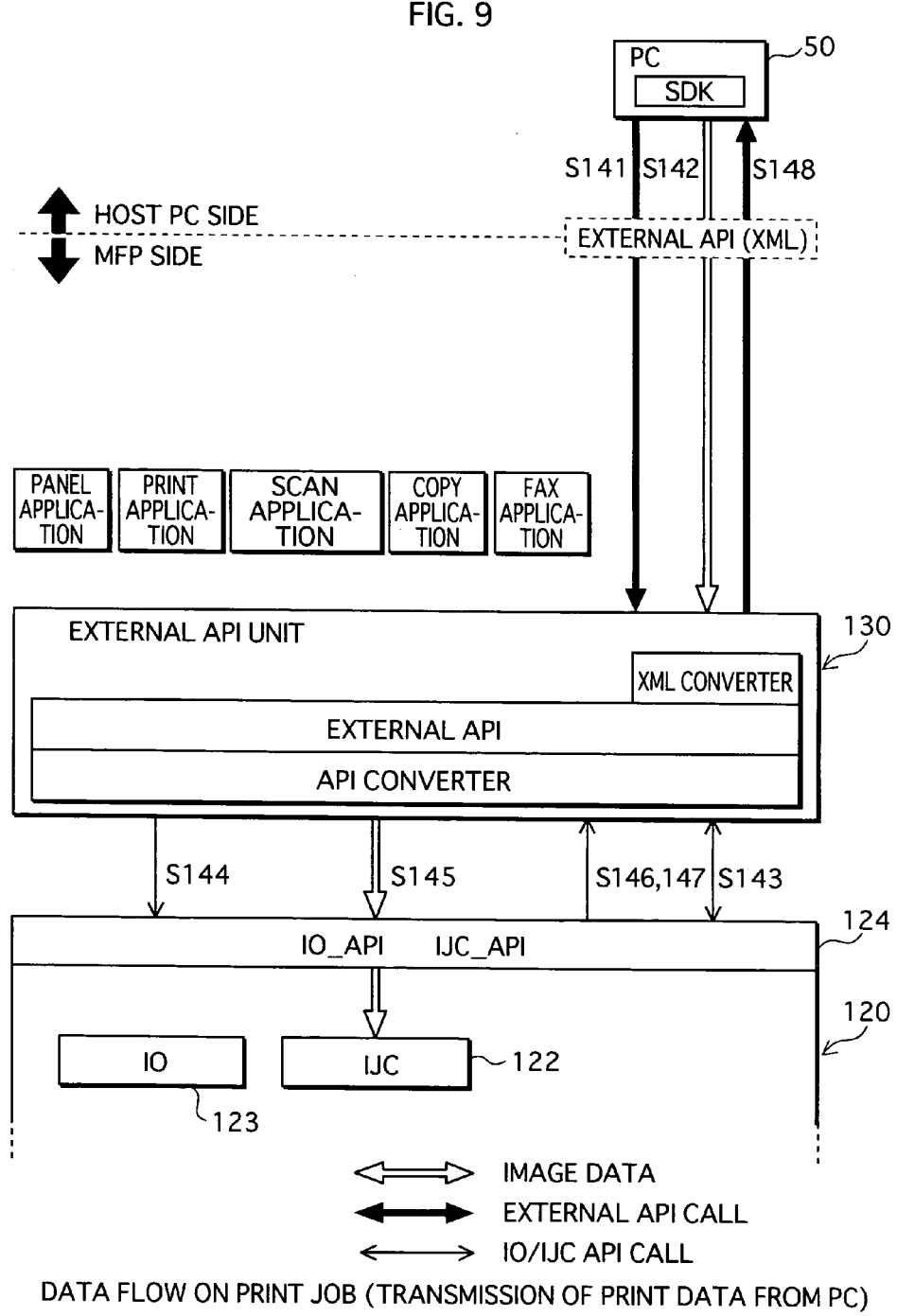
FIG. 9 is a schematic view illustrating the data flow for performing, according to the second embodiment, a print job of printing out image data transmitted from the PC.

Next, description is given with reference to FIG. 9 to an example in which a print job is performed from an external source without activating the print application 142. Similarly to the above examples, the external API 132 publicly released includes information necessary for performing a print job without activating the print application 142.

As illustrated in FIG. 9, the external API unit 130 receives an external API call to start a print job (a predetermined command for performing a print job without activating the print application 142) from the PC 50 (S141). Then, the external API unit 130 receives image data from the PC 50 (S142) as well as XML data containing print conditions (S143).

The external API unit 130 informs the IJC 122 residing on the control layer 120 about a print instruction as well as conditions necessary for the print job, such as a paper size (S144), and subsequently transmits the image data (S145).

The control layer 120 controls the printer 11 to perform the print job based on the received print conditions and image data. Further, the control layer 120 sequentially sends information indicating a job status to the external API unit 130, such as a print job being processed or an end of job (S146).

The external API unit 130 receives from the control layer 120, information indicating that the print job is being processed, and then receives information indicating an end of job (S147). On receiving the latter information, the external API unit 130 informs the PC 50 about an end of job (S148) and terminates the processing.

As described above, similarly to the first embodiment, by transmitting an appropriate command and other data from the PC 50 to the MFP 100 for controlling the printer 11 to perform a print job, the print job can be performed without activating the print application 142. In other words, it is avoided that data that the PC 50 can manage is refused due to incapability of the printer application 142. As a result, the scalability of the MFP 100 improves.

Further, similarly to the above examples of the scan job and the print job, in any other jobs such as a copy job, XML data containing a command and parameter necessary for performing a desired job can be transmitted from the PC 50 to the MFP 100 as data containing a request relating to image processing. On receiving such data, the external API unit 130 converts it to a command supported by the control layer 120 and passes the resulting command to the control layer 120.

As described above, the MFP 100 according to the second embodiment includes the external API unit 130 that receives from an external source, XML data containing a request relating to image processing, converts the XML data to commands supported by the API of the control layer 120, and passes the resulting commands to the control layer 120. Accordingly, even after the MFP 100 is delivered to the user, it is possible to extend the functionality of the MFP 100 without any alterations to the existing applications provided therein, so that new functionality that the existing applications are incapable of can be performed. In other words, the MFP 100 is advantageous for users due to the improved scalability and improved user convenience.

Further, the MFP 100 has a hierarchical architecture in which the control layer 120, the external API unit 130, and the application layer 140 are arranged in the stated order. Consequently, when a design change is made to e.g., the IJC 122 residing on the control layer 120, the design change is accommodated by only modifying the API converter 131 of the external API unit 130 so as to perform different operations (To be more specific, the API converter 131 needs to be modified so as to be able to call the IO/IJC API 124 of the post-alteration control layer 120). The existing applications and the like are usable as they are (no modification is required to the applications). Consequently, the MFP 100 of the second embodiment is advantageous for MFP developers in saving time and work for alteration and checking of the applications, and thus the development is completed in a shorter time period with smaller work load than that would otherwise be required. In view of this advantage, the configuration according to the second embodiment is especially suitable to the case where a design change is expected to the control layer 120 in the feature. This configuration is highly effective in making adaptations required when such design change takes place.

Third Embodiment

According to the second embodiment described above, the hardware resource 10, the control layer 120, the external API unit 130, and the application layer 140 are arranged in a hierarchical architecture in the stated order. A third embodiment differs from the second embodiment in that a control layer is arranged between a hardware resource and an application layer and an external API unit is arranged superordinate to the application layer in a hierarchical architecture. The control layer is capable of giving and receiving commands to and from both the application layer and the external API unit. Further, the external API unit is capable of giving and receiving commands to and from the application layer.

Figure 10:
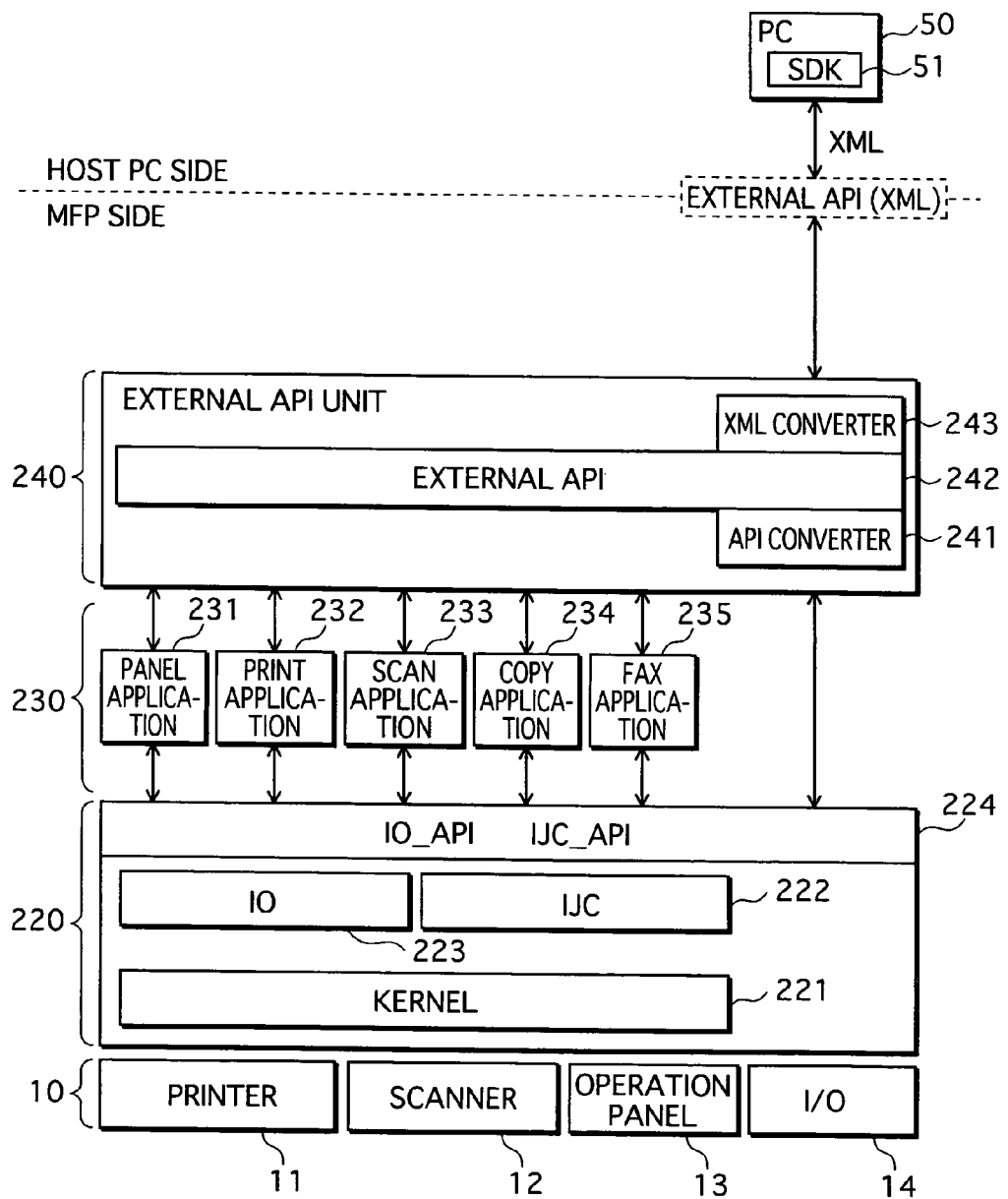
FIG. 10 is a view illustrating a system configuration of an MFP according to a third embodiment.

FIG. 10 is a view illustrating a system configuration of an MFP 200 according to the third embodiment.

As illustrated in the figure, the MFP 200 has a hierarchical architecture with a device layer (hardware resource) 10 as the bottommost layer, a control layer 220 (first control program) directly controlling the device layer 10, an application layer 230 being superordinate to the control layer 220, and an external API unit 240 (second control program) being superordinate to the application layer 230 (practically, the external API unit 240 is arranged such that giving and receiving of commands are possible to or from both the control layer 220 and the application layer 230). The MFP 200 is a digital multifunction peripheral capable of a plurality of jobs relating to image processing, including the above-described scan job, copy job, print job, and FAX job.

The control layer 220 includes a kernel 221, an IJC 222, IO 223, and IO/IJC API 224. The kernel 221, the IJC 222, and the IO 223 are similar in functionality to the above-descried kernel 21, the IJC 22, and the IO 23, respectively.

The IO/IJC API 224 is an API for providing functionality of the IJC 222 and the IO 223 (i.e., functionality of the control layer 220) to applications 231-235 residing on the application layer 230. To be more specific, the IO/IJC API 224 is a collection of functions callable by each application in order to access functionality of the control layer 220. In other words, the IO/IJC API 224 receives requests relating to image processing from each application through the use of predefined functions.

The IO/IJC API 224 also acts as an API for providing functionality of the control layer 220 to the PC 50 via the external API unit 240. In this case, the IO/IJC API 224 serves as a collection of functions to be called by the external API unit 240 when receiving a request relating to image processing from the PC 50, so that the IO/IJC API 224 can access functionality of the control layer 220.

The external API unit 240 includes an API converter 241, an external API 242, and an XML converter 243, and is a program for converting a request relating to image processing from the PC 50 to a format directly executable by the control layer 220, and passes the resulting data to the control layer 220 or to an appropriate one of the applications as necessary.

The external API 242 is an API for providing functionality of the control layer 220 to an external source. That is to say, the external API 242 is a collection of predefined functions callable by the PC 50 in order to access functionality of the control layer 220.

Note that the external API 242 is released publicly to external users in advance. With reference to the released external API, external users are able to develop software for accessing functionality of the control layer 220. In this aspect, the external API 242 is basically similar to the external API 361 described the first embodiment.

Similarly to the external API 132 described in the second embodiment, the external API 242 is a collection of a plurality of sets of functions that are predefined as the IO/IJC API 224. Since a series of operations is defined by a single function, the external API 242 eliminates the need for external users to use numerous functions, and thus provides easiness and convenience in developing such software as described above. Note that a function that defines one complete operation is used as it is.

The XML converter 243 extracts a command and other data from XML data received from the PC 50.

The API converter 241 converts the extracted command and other data (a request relating to image processing received from the PC 50) into a predetermined data format executable by the control layer 220, and passes the resulting data to the control layer 220 or to an appropriate one of the applications.

The application layer 230 includes the above-mentioned applications 231-235, each of which makes an access to the IO/IJC API 224 to call an appropriate one of the predefined functions, thereby actually driving a desired device. Note that each of the panel application 231, the print application 232, the scan application 233, the copy application 234, and the FAX application 235 is identical in functionality to a corresponding application described in the first embodiment. In addition, each of the applications in this embodiment is capable of accessing the external API unit 240 to receive a request relating to image processing, and controlling each device to perform image processing according to the received request.

With provision of the external API unit 240, it is possible to instruct the MFP 200 from an external source to perform functionally that the applications provided therein are incapable of performing.

For example, the control layer 220 is capable of e-mail transmission to or from an external source. Yet, the scan application 233 is not provided with a so-called "Scan to E-mail" feature and thus is not capable of transmitting scanned image data as an e-mail attachment to a designated transmission destination. Here, by publicly releasing the external API 242 that includes information necessary for performing a scan job using the Scan to E-mail feature, external users are allowed to develop software that transmits to the MFP 200, XML data containing a command and other data necessary for the san job. In other words, the desired scan job can be performed from an external source.

Hereinafter, with reference to FIGS. 11 and 12, description is given in detail to specific examples in which the above scan job is performed.

Figure 11:
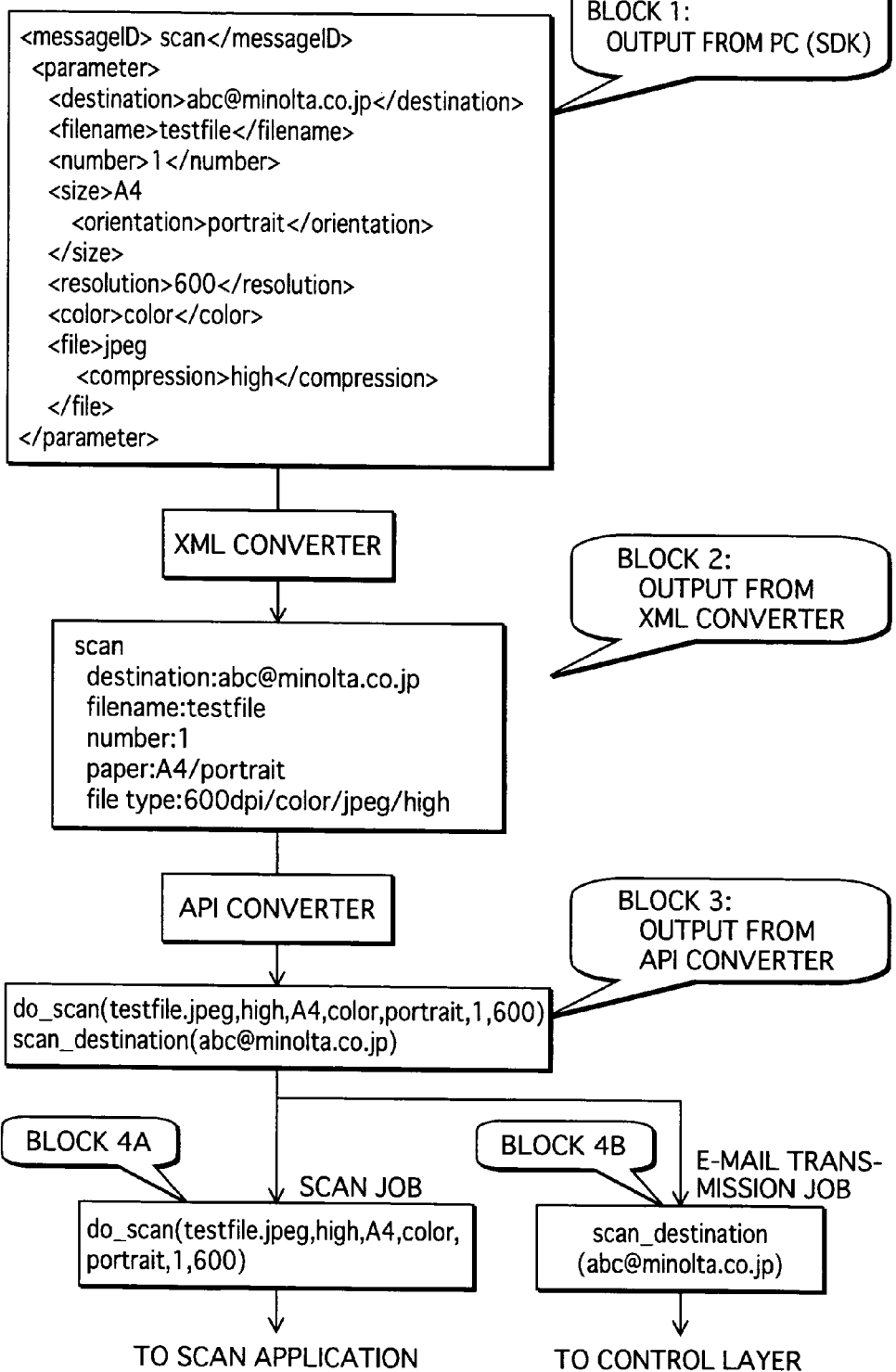
FIG. 11 is a schematic view illustrating XML data according to the third embodiment that contains a command and other data necessary for instructing a scan job at a desired scanning resolution, and how the XML data is converted as it is passed from the PC to a control layer via an external API application of the MFP.

FIG. 11 is a schematic view illustrating XML data that is generated by an external user based on the released API and that contains a command and other data necessary for instructing the above scan job, along with how the XML data is converted as it is passed from the PC 50 to the scan application 233 and to the control layer 220 via the external API unit 240 of the MFP 200.

As illustrated in the figure as a block 1, the PC 50 outputs XML data describing information items, such as a document size, enclosed in predetermined tags. The data at this stage is identical to the data illustrated in FIG. 2 as the block 1.

Received by the MFP 200, the XML data is passed via the IO 223 to the XML converter 243 of the external API unit 240 where the XML data is converted to data shown as a block 2 in FIG. 11. The data at this stage is also identical to the data illustrated in FIG. 2 as the block 2.

The data illustrated as the block 2 is then passed to the API converter 241 where it is converted to a format directly executable by the control layer 220 (i.e., to a command supported by the IO/IJC API 224). The resulting data is shown in the figure as a block 3.

In the block 3, "do_scan" and "scan_desitination" are functions instructing the control layer 220 to actually perform the scan job, and subsequent parameters in parentheses are arguments of the functions. Note that the commands resulting from the conversion are executable by the control layer 220 and also by the applications 231-235.

Depending on the requested processing, the external API unit 240 decides to which of the applications or the modules of the control layer 220 the data illustrated as the block 3 is to be passed (i.e. select a destination of the data). To be more specific, if a command is executable by a specific application, the command is passed directly to the application (without through the control layer 220).

In this example, the data (block 3) is divided into data used to perform scanning (block 4A) and data used for e-mail transmission (block 4B). The data of the block 4A is then passed to the scan application 233, while the data of the block 4B is passed to the control layer 220 that performs e-mail transmission. Note that it is predetermined that which commands are to be passed to which component.

On receiving the data of the block 4A, the scan application 233 calls a corresponding function, thereby causing the scan job to be performed. In other words, the scan application 233 passes a processing request for the processing based on the data shown as the block 4A to the control layer 220. To be more specific, the scan application 233 controls the scanner 12 to scan an image of a document based on the specified scanning conditions (such as the document size: A4).

Similarly, on receiving the data of the block 4B, the control layer 220 calls a corresponding function, thereby causing the Scan to E-mail transmission to be performed. To be more specific, the control layer 220 transmits the scanned image data to the designated transmission destination (abc@minolta.co.jp).

Figure 12:
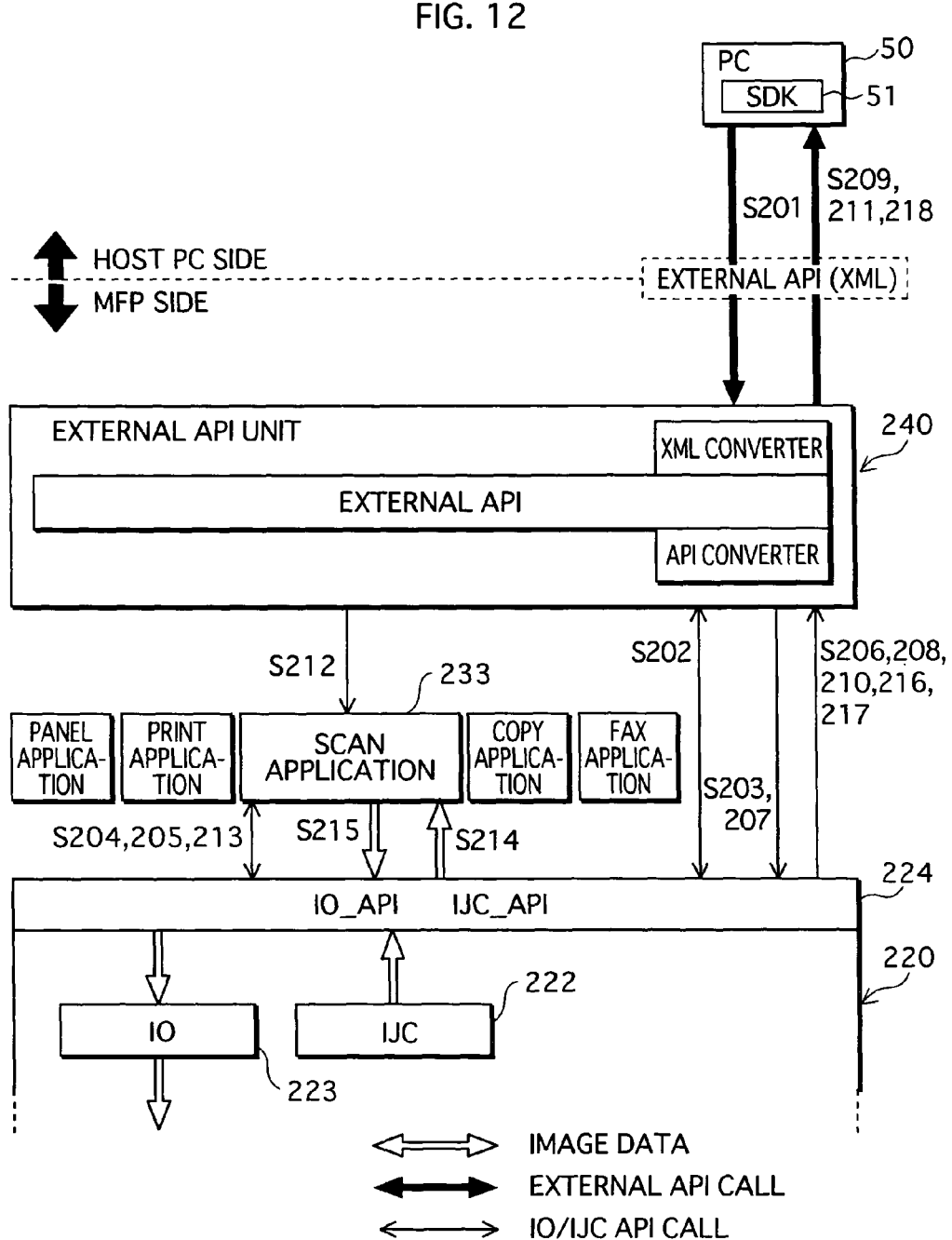
FIG. 12 is a schematic view illustrating the data flow between the PC and the MFP for performing, according to the third embodiment, the above scan job.

FIG. 12 is a schematic view illustrating the data flow between the PC 50 and the MFP 200 for performing the above scan job.

As shown in the figure, the external API unit 240 receives an external API call to start a scan job from the PC 50 via the IO 223 (S201). On receiving the call, the external API unit 240 operates to receive XML data containing scanning conditions and other information from the PC 50 (S202), and requests the scan application 233 to confirm that the scan application 233 is connected with the IO 223 (S203). When the scan application 233 and the IO 223 confirm the connection therebetween (S204), a connection confirmation notification is issued (S205), and then the external API unit 240 receives the notification from the control layer 220 (S206).

The external API unit 240 then informs the control layer 220 about a scan job instruction and a transmission destination of the Scan to E-mail transmission (S207), and receives a response to the instruction such as an OK signal to start the scan job (S208). On receiving such a response, the external API unit 240 informs the PC 50 about the received response (S209). On receiving a ready signal for the requested job (S210), the external API unit 240 informs the PC 50 that the MFP 200 is in a state of readiness to start the requested job (S211), and subsequently informs the scan application 233 about the scanning conditions such as the document size (S212).

In response, the scan application 233 operates to start the scan job based on the scanning conditions, and issues a request for acquiring the scanned image data to the control layer 220 (S213). On acquiring the image data from the control layer 220 (the IJC 222) (S214), the scan application 233 conducts predetermined processing such as data compression, and performs the Scan to Email transmission of the resulting image data to the designated transmission destination via the IO 223 (S215).

The external API unit 240 sequentially receives information indicating states of the job being carried out (S216), such as conversion to a transmission file being processed or transmission being processed. Thereafter, on receiving an end-of-job signal (S217), the external API unit 240 informs the PC 50 about the end of job (S218), and terminates the processing.

As described above, by transmitting an appropriate command and other data from the PC 50 to the MFP 200 accordingly to the released external API 242 for performing a scan job using the Scan to E-mail feature, the scan job that the scan application 233 is incapable of can be performed from an external source. Further, since the MFP 200 of this embodiment is configured to be capable of activating the scan application 233, a scan job can be performed by transmitting a command for activating the scan application 233 from an external source. On receiving such a command, the scan application 233 can carry out necessary control of the scanner 12 to perform the scan job. Consequently, external users are allowed to perform a series of operations from scanning of a document image to transmission of the scanned image to a designated transmission destination without specifying every operation using a predetermined command. That is to say, the external API facilitates external users to remotely perform a scan job.

Further, the MFP 200 of this embodiment is configured to directly pass a command and other data that are executable by the application (the block 4A in FIG. 11) to the scan application 233 from the external API unit 240. Consequently, the load imposed on the control layer 220 is reduced in comparison with the case where all the commands and data are processed through the control layer 220.

Figure 13:
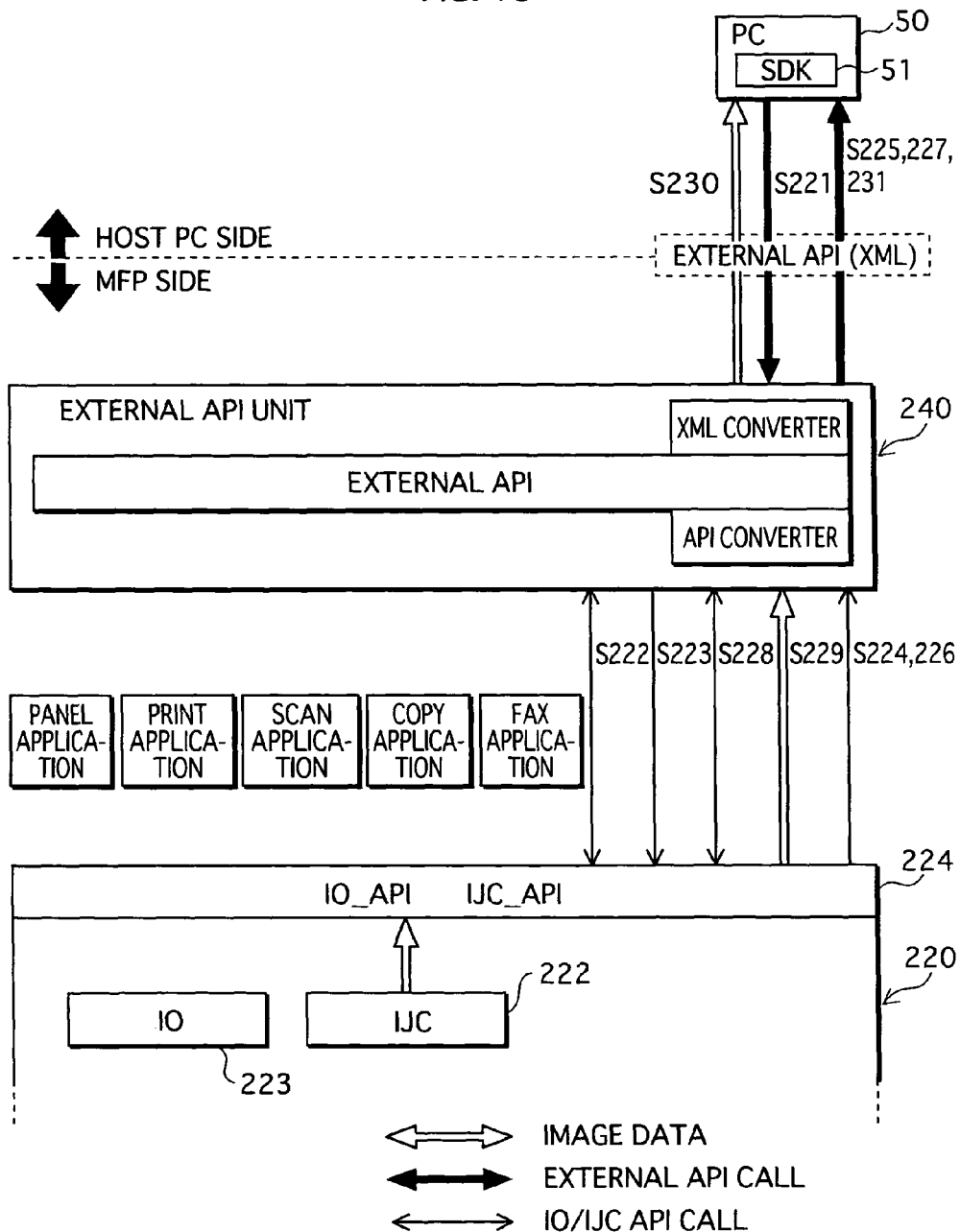
FIG. 13 is a schematic view illustrating the data flow between the PC and the MFP for performing, according to the third embodiment, a scan job performed without activating a scan application.

Next, description is given with reference to FIG. 13 to an example in which a scan job is performed without activating the scan application 233.

As shown in the figure, the external API unit 240 receives an external API call to start the scan job from the PC 50 (a predetermined command to perform the scan job without activating the scan application 233) (S221). On receiving the external API call, the external API unit 240 operates to receive XML data containing scanning conditions and a transmission destination from the PC 50 (S222). In this example, the PC 50 is designated as the transmission destination.

The external API unit 240 instructs the control layer 220 to perform the scan job (S223), and receives a response to the instruction, such as an OK signal to start the scan job (S224) On receiving the response, the external API unit 240 informs the PC 50 about the received response (S225). Thereafter, on receiving a ready signal for the requested job from the control layer 220 (S226), the external API unit 240 informs the PC 50 that the MFP 200 is in a state of readiness to start the requested job (S227), and subsequently informs the control layer 220 about the scanning conditions, such as a document size, and also of the transmission destination (S228).

In response, the control layer 220 controls the scanner 12 to scan an image of a document according to the specified scanning conditions, such as the document size, and sends the scanned image data to the external API unit 240 via the IJC 222 (S229).

On receiving the image data from the control layer 220 (the IJC 222), the external API unit 240 so operates that the image data is transmitted via the IO 223 to the PC 50 being the transmission destination (S230).

On completion of the transmission, the external API unit 240 informs the PC 50 about the completion of the transmission (S231), and terminates the processing.

As described above, similarly to the first and second embodiments, by publicly releasing the external API 242 that includes information necessary for performing a scan job without activating the scan application 233, a necessary command and parameter for the scan job can be transmitted from an external source. By transmitting such a command and parameter, a scan job that the scan application 233 is incapable of can be performed from an external source without activating the scan application 233.

Figure 14:
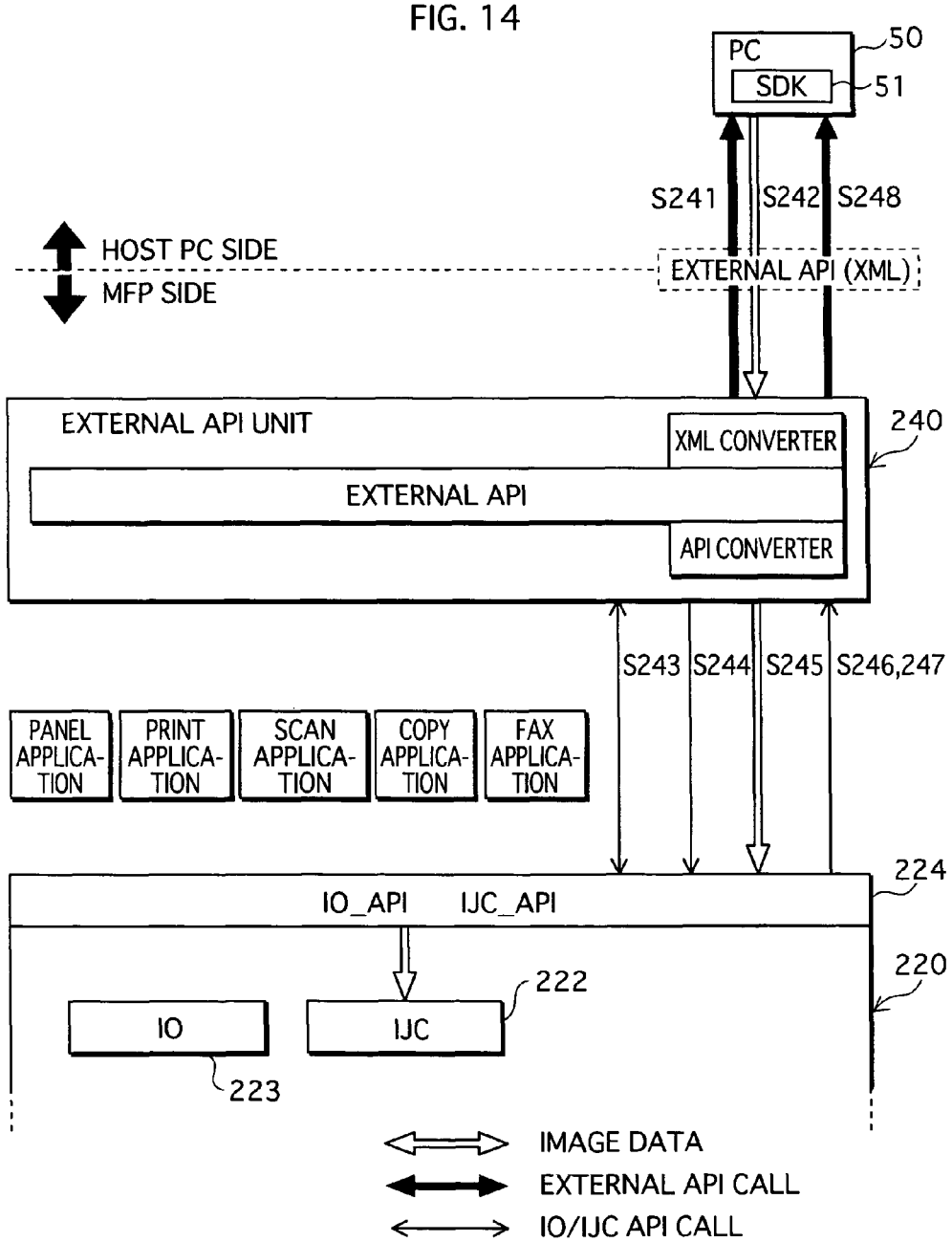
FIG. 14 is a schematic view illustrating the data flow for performing, according to the third embodiment, a print job of printing out image data transmitted from the PC.

Now, description is given with reference to FIG. 14 to an example in which a print job is performed from an external source without activating the print application 232. Similarly to the above examples, the external API 242 publicly released includes information necessary for performing a print job without activating the print application 232.

As illustrated in the figure, on receiving an external API call to start a print job (a predetermined command for performing a print job without activating the print application 232) from the PC 50 (S241), the external API unit 240 operates to acquire image data from the PC 50 (S242). Thereafter, the external API unit 240 further receives from the PC 50, XML data containing print conditions (S243).

The external API unit 240 then informs the IJC 222 residing on the control layer 220 about a print instruction and print conditions necessary for the print job (S244), and subsequently sends the image data (S245).

In response, the control layer 220 controls the printer 11 to perform the print job based on the received print conditions and image data. Further, the control layer 220 sequentially sends information indicating a job status to the external API unit 240, such as a print job being processed or an end of job (S246).

The external API unit 240 receives from the control layer 220, information indicating that the print job is being processed, and then receives information indicating an end of job (S247). On receiving the latter information, the external API unit 240 informs the PC 50 about an end of job (S248), and terminates the processing.

Similarly to the first and second embodiments, by transmitting an appropriate command and parameter from the PC 50 to the MFP 200 for controlling the printer 11 to perform a print job, the print job that can be performed without activating the print application 232.

Further, although the above examples specifically describe the scan job and the print job, other jobs such as a copy job can be performed similarly by transmitting, from the PC 50 to the MFP 200, data containing a request relating image processing, i.e., XML data containing a command and a parameter necessary for performing the requested job. The XML data is then converted by the external API unit to a command executable by the control layer or by the applications, the resulting data is then passed to the control layer or the applications.

As described above, the MFP 200 according to the third embodiment includes the external API unit 240 that receives from an external source, XML data containing a request relating to image processing, converts the XML data to a command supported by the API of the control layer 220, and passes the resulting commands to the control layer 220 or the applications. Accordingly, even after the MFP 200 is delivered to the user, it is possible to extend the functionality of the MFP 200 without any alterations to the existing applications provided therein, so that new functionality that the existing applications are incapable of can be performed.

Further, each application according to the third embodiment is capable of accessing both the control layer 220 and the external API unit 240. In addition, if a request relating to image processing from an external source is directed to any of the applications, the external API unit 240 passes the request directly to an appropriate application (without through the control layer 220). Consequently, the load imposed on the control layer 220 is reduced in comparison with the case where all the commands and data are processed through the control layer 220, which realizes a faster processing speed.

Further, since it is not necessary to provide the control layer 220 with capability of mediating between an external source and the applications, the control layer 220 may be simplified in configuration.

Further, the external API unit 240 is capable of directly accessing the applications without through the control layer 220. Thus, by providing the external API unit 240 with capability of job management for the applications, it is possible, without providing such capability to the control layer 220, that the external API unit 240 controls the states of the applications. With this configuration, the load imposed on the control layer 220 is reduced in comparison with the case where the control layer 220 performs the job management.

Although the present invention has been described by way of an image processing apparatus such as an MFP, the present invention may also be embodied as a method for performing the processing described above, or as a program run by a computer to perform the method. Further, the present invention may be embodied as a computer-readable recording medium storing the above program. Examples of such a computer-readable recording medium include a magnetic tape, a magnetic disk such as a flexible disk, an optical medium such as a DVD, a CD-ROM, a CD-R, an MO and a PD, a flash memory such as Smart Media (Registered Trademark) and CompactFlash (Registered Trademark). Still further, the present invention may be manufactured or transferred in form of a recording medium, and transmitted and provided in form of a program via a various types of wired or wireless network, such as the Internet, broadcast, an electronic communications network, and satellite communications.

Modifications

Up to this point, the present invention has been described by way of the above embodiments. However, it is naturally appreciated that the present invention is not limited to those specific embodiments described above, and various modifications including the following may be made.

(1) In the above embodiments, a request relating to image processing is described in XML. However, the present invention is not limited thereto, and a request relating to image processing may be described in HTML (Hypertext Markup Language) for example. In this case, the MFP receives from a PC, HTML data in which a request relating to image processing is embedded. Accordingly, the external API application or the external API unit needs to be configured to convert HTML data to data executable by the control layer.

(2) In the above embodiments, the control layer and the external API application (external API unit) are configured as two separate components. However, it is possible to configure, for example, the external API application (external API unit) as a part of the control layer.

(3) In the above embodiments, the MFP is connected to the PC via a network. However, the connection may be established via any scheme as long as communications therebetween are performed to mutually transmit data such as a processing request. For example, the MFP may be connected to the PC directly.

Further, although the present invention is applied in the above embodiments to a digital MFP, the present invention is applicable generally to any image processing apparatus, such as a scanner, a printer, and a facsimile.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An image processing apparatus comprising:
a hardware resource that includes at least one of an image forming unit, a read unit, and a display unit;
a control layer;
an external API (application program interface) program; and
an application group including one or more application programs stored in an application layer,
wherein the hardware resource, the control layer, the external API program and the application group are arranged in such a hierarchical architecture that the control layer is superordinate to the hardware resource, and
the application group including the one or more application programs and the external API program are superordinate to the control layer,
the control layer includes a first API for receiving, with use of a predefined function, a first request relating to image processing from the external API program and a second request relating to image processing from the one or more application programs, and controls, on receiving either of the first and second requests, the hardware resource to perform image processing based on the received request, and
the external API program includes a second API for receiving a third request relating to image processing from an external source, converts the received third request to a command supported by the first API, and passes the command as the first request to the control layer, bypassing the one or more application programs of the application group stored in the application layer;
wherein commands, parameters, and syntax for controlling the hardware resource are released to the public for incorporation by external users into software supported by the second API.

2. The image processing apparatus according to claim 1, wherein the control layer passes the received first request to the one or more application programs if the first request is directed to the one or more application programs.

3. The image processing apparatus according to claim 1, wherein the third request is data expressed in an XML.

4. The image processing apparatus according to claim 3, wherein the external API program further includes: a first converting unit for extracting predetermined information from the received XML data; and a second converting unit for converting the extracted information to the command supported by the first API.

5. The image processing apparatus according to claim 1, wherein upon receiving a request relating to execution of a print job, the control layer controls the image forming unit to perform the print job.

6. The image processing apparatus according to claim 1, wherein upon receiving a request relating to execution of a scan job, the control layer controls the read unit to perform the scan job.

7. The image processing apparatus according to claim 1, wherein the second API includes a function callable by the external source, wherein the function calls a plurality of functions that are predefined by the control layer.

8. An image processing apparatus comprising:
a hardware resource including at least one of an image forming unit, a read unit, and a display unit;
a control layer;
an external API (application program interface) program; and
an application group including one or more application programs stored in an application layer,
wherein the hardware resource, the control layer, the application group and the external API program are arranged in such a hierarchical architecture that the control layer is superordinate to the hardware resource, and the application group including the one or more application programs and the external API program are superordinate to the control layer,
the control layer includes a first API for receiving, with use of a predefined function, a first request relating to image processing from the external API program, and controls the hardware resource to perform image processing based on the received first request, and
the external API program includes a second API for receiving a second request relating to image processing from an external source and a third request relating to image processing from the one or more application programs, converts, on receiving either of the second and third requests, the received request to a command supported by the first API, and passes the command as the first request to the control layer, bypassing the one or more application programs of the application group stored in the application layer;
wherein commands, parameters, and syntax for controlling the hardware resource are released to the public for incorporation by external users into software supported by the second API.

9. The image processing apparatus according to claim 8, wherein the external API program passes the received second request to the one or more application programs if the second request is directed to the one or more application programs.

10. The image processing apparatus according to claim 8, wherein the second request is data expressed in an XML.

11. The image processing apparatus according to claim 10, wherein the external API program further includes: a first converting unit for extracting predetermined information from the received XML data; and a second converting unit for converting the extracted information to the command supported by the first API.

12. The image processing apparatus according to claim 8, wherein upon receiving a request relating to execution of a print job, the control layer controls the image forming unit to perform the print job.

13. The image processing apparatus according to claim 8, wherein upon receiving a request relating to execution of a scan job, the control layer controls the read unit to perform the scan job.

14. The image processing apparatus according to claim 8, wherein the second API includes a function callable by the external source, wherein the function calls a plurality of functions that are predefined by the control layer.

15. An image processing apparatus, comprising: a hardware resource including at least one of an image forming unit, a read unit, and a display unit; a control layer; an external API (application program interface) program; and an application group including one or more application programs stored in an application layer, wherein the control layer is arranged between the hardware resource and the application group including the one or more application programs, and the external API program is arranged superordinate to the one or more application programs in the application group in a hierarchical architecture, the control layer includes a first API for receiving, with use of a predefined function, a first request relating to image processing from the external API program and a second request relating to image processing from the one or more application programs, and controls, on receiving either of the first and second requests, the hardware resource to perform image processing based on the received request, the external API program includes a second API for receiving a third request relating to image processing from an external source, converts the received third request to a command supported by the first API, and passes the command to an appropriate one of the control layer, and the one or more application programs, depending on the requested processing, the command passed to the control layer serving as the first request, wherein commands, parameters, and syntax for controlling the hardware resource are released to the public for incorporation by external users into software supported by the second API, wherein the third request is data expressed in an XML, and wherein the external API program further includes: a first converting unit for extracting predetermined information from the received XML data; and a second converting unit for converting the extracted information to the command supported by the first API.

16. An image processing apparatus, comprising: a hardware resource including at least one of an image forming unit, a read unit, and a display unit; a control layer; an external API (application program interface) program; and an application group including one or more application programs stored in an application layer, wherein the control layer is arranged between the hardware resource and the application group including the one or more application programs, and the external API program is arranged superordinate to the one or more application programs in the application group in a hierarchical architecture, the control layer includes a first API for receiving, with use of a predefined function, a first request relating to image processing from the external API program and a second request relating to image processing from the one or more application programs, and controls, on receiving either of the first and second requests, the hardware resource to perform image processing based on the received request, the external API program includes a second API for receiving a third request relating to image processing from an external source, converts the received third request to a command supported by the first API, and passes the command to an appropriate one of the control layer, and the one or more application programs, depending on the requested processing, the command passed to the control layer serving as the first request, wherein commands, parameters, and syntax for controlling the hardware resource are released to the public for incorporation by external users into software supported by the second API, wherein the second API includes a function callable by the external source, wherein the function that calls a plurality of functions that are predefined by the control layer.

17. An image processing apparatus comprising:
a hardware resource that includes at least one of an image forming unit, a read unit, and a display unit;
a control layer;
an external API (application program interface) program; and
an application group including one or more application programs stored in an application layer,
wherein the hardware resource and the programs are arranged in such a hierarchical architecture that the control layer is superordinate to the hardware resource, and the one or more application programs and the external API program are superordinate to the control layer,
the control layer includes a first API for receiving a first request relating to image processing from the external API program and a second request relating to image processing from the one or more application programs, and controls, on receiving either of the first and second requests, the hardware resource to perform image processing based on the received request, and
the external API program includes a second API for receiving a third request relating to image processing from an external source, converts the received third request to a command supported by the first API, and passes the command as the first request to the control layer, bypassing one or more application programs of the application group stored in the application layer;
wherein commands, parameters, and syntax for controlling the hardware resource are released to the public for incorporation by external users into software supported by the second API,
wherein the software is used to control the hardware resource to perform processing that is not executable by the hardware resource under control of any of the one or more application programs.

18. The image processing apparatus according to claim 17, wherein the second API is an external API for controlling operations of the hardware resource according to requests received from an external device.

19. The image processing apparatus according to claim 17, wherein the second API includes a function callable by the external source, wherein the function calls a plurality of functions that are predefined by the control layer.

* * * * *